(12) United States Patent
Aridome

(10) Patent No.: US 7,894,706 B2
(45) Date of Patent: Feb. 22, 2011

(54) METHOD OF RECORDING COMPRESSED IMAGE DATA MULTIPLEXED WITH ADDITIONAL INFORMATION

(75) Inventor: Kenichiro Aridome, Kanagawa (JP)

(73) Assignee: Sony Corporation, Tokyo (JP)

( * ) Notice: Subject to any disclaimer, the term of this patent is extended or adjusted under 35 U.S.C. 154(b) by 1156 days.

(21) Appl. No.: 10/730,053

(22) Filed: Dec. 9, 2003

(65) Prior Publication Data

US 2004/0126097 A1    Jul. 1, 2004

(30) Foreign Application Priority Data

| Dec. 27, 2002 | (JP) | ............................. 2002-379129 |
| Mar. 27, 2003 | (JP) | ............................. 2003-086888 |
| Aug. 26, 2003 | (JP) | ............................. 2003-300750 |

(51) Int. Cl.

| H04N 5/935 | (2006.01) |
| H04N 5/932 | (2006.01) |
| H04N 9/80 | (2006.01) |
| G11B 21/08 | (2006.01) |
| G11B 7/085 | (2006.01) |
| G11B 17/22 | (2006.01) |

(52) U.S. Cl. ...................... 386/214; 386/217; 386/220; 386/239; 386/332; 386/334; 369/30.25; 369/30.28; 369/30.3; 369/30.35; 369/30.41

(58) Field of Classification Search ......... 386/123–126, 386/95, 46, 98, 104–106, 214, 217, 220, 386/239, 332, 334; 369/30.25, 30.28, 30.3, 369/30.35, 30.41, 47.2
See application file for complete search history.

(56) References Cited

U.S. PATENT DOCUMENTS

| 6,308,005 B1 * | 10/2001 | Ando et al. .................... 386/95 |
| 6,833,865 B1 * | 12/2004 | Fuller et al. ............... 348/231.2 |
| 7,139,467 B2 * | 11/2006 | Seo et al. ........................ 386/95 |
| 7,313,316 B2 * | 12/2007 | Winter .......................... 386/95 |
| 2002/0039485 A1 * | 4/2002 | Fujita et al. .................. 386/125 |
| 2002/0041754 A1 * | 4/2002 | Kikuchi et al. ................. 386/46 |

FOREIGN PATENT DOCUMENTS

| JP | 8-235832 | 9/1996 |
| JP | 11-298849 | 10/1999 |
| JP | 11-341441 | 12/1999 |
| JP | 2001-169246 | 6/2001 |

OTHER PUBLICATIONS

"Wikipedia, the free encyclopedia, F-number" http://en.wikipedia.org/wiki/F-number google keywords "f stop" or "f number".*

* cited by examiner

Primary Examiner—Thai Tran
Assistant Examiner—Daquan Zhao
(74) Attorney, Agent, or Firm—Oblon, Spivak, McClelland, Maier & Neustadt, L.L.P.

(57) ABSTRACT

When data of image information is compressed and is recorded on a recording medium, additional information about the image information is recorded in a conveniently usable state. There is provided read/write unit information as a unit of reading and writing the compressed image information to the recording medium. The read/write unit information contains a plurality of units of decoding and reproducing unit information that comprises one frame (or one field) of the image information. At least one piece of decoding and reproducing unit information is subject to compression encoding through the use of only image information in the decoding and reproducing unit. In the read/write unit information, there is multiplexed and recorded additional information about the decoding and reproducing unit information for a plurality of units within the read/write unit in an extractable manner separately from the compressed image information.

24 Claims, 15 Drawing Sheets

FIG. 6

| RBP | FIELD NAME | CONTENTS | NUMBER OF BYTES |
|---|---|---|---|
| | IDENTIFIER FOR ADDITIONAL RECORDING INFORMATION | | Total 12 |
| 0 to 7 | ARI_DAT_ID | DATA IDENTIFIER FOR ADDITIONAL RECORDING INFORMATION | 8 |
| 8 to 9 | ARI_DAT_VER | ADDITIONAL RECORDING INFORMATION VERSION | 2 |
| 10 to 11 | reserved | reserved | 2 |
| | APPLICATION INFORMATION | | Total 52 |
| 12 to 16 | VND_NAME | VENDOR NAME | 5 |
| 17 to 28 | PRD_NAME | PRODUCT NAME | 12 |
| 29 | APL_ID | APPLICATION ID | 1 |
| 30 to 61 | MNFI_DATA | Manufacturer's Information Data | 32 |
| 62 to 63 | reserved | reserved | 2 |
| | RECORDING TIME INFORMATION | | Total 8 |
| 64 to 65 | VOBU_LCL_TM_ZOME | TIME ZONE FOR RECORDING ARI_DATA | 2 |
| 66 to 70 | VOBU_REC_TM | RECORDING TIME INFORMATION OF ARI_DATA | 5 |
| 71 | reserved | reserved | 1 |
| | CAMERA INFORMATION | | Total 1872 |
| 72 to 73 | F_NUM | F NUMBER | 2 |
| 74 to 77 | EXP_TM | EXPOSURE TIME | 4 |
| 78 | EXP_PRG | EXPOSURE PROGRAM | 1 |
| 79 | EXP_PRG_EX | EXPOSURE PROGRAM EXTENDED INFORMATION | 1 |
| 80 to 81 | EXP_BIS_VAL | EXPOSURE CORRECTION VALUE | 2 |
| 82 | AGC | GAIN VALUE | 1 |
| 83 to 84 | MAX_APE_VAL | LENS MINIMUM F VALUE | 2 |
| 85 | FLS | FLASH | 1 |
| 86 to 87 | FCL_LEN | LENS FOCAL LENGTH | 2 |
| 88 | CST_REN | INDIVIDUAL IMAGE PROCESS | 1 |
| 89 | WHT_BAL | WHITE BALANCE | 1 |
| 90 | SCN_CAP_TYP | CAPTURING SCENE TYPE | 1 |
| 91 | FCS_MOD | FOCUS MODE | 1 |
| 92 to 93 | FCS_POS | OBJECT DISTANCE | 2 |
| 94 | IMG_STB | CAMERA SHAKE CORRECTION | 1 |
| 95 | DIG_ZOM | DIGITAL ZOOM MAGNIFICATION | 1 |
| 96 to 110 | GPS_INFO | POSITIONAL INFORMATION | 14 |
| 111 | STB_LIM | CAMERA SHAKE CORRECTION LIMIT | 1 |
| 112 to END | reserved | reserved | |

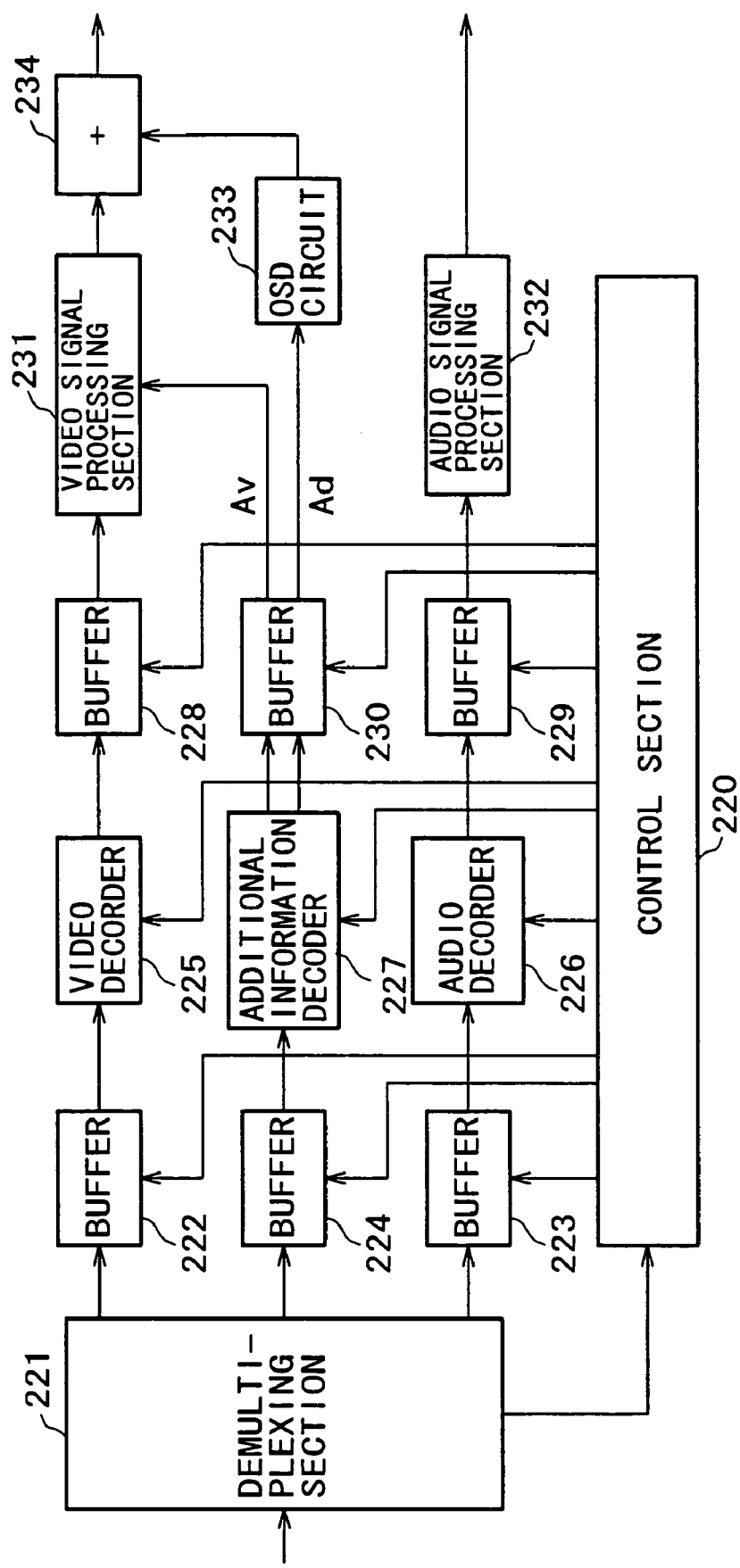

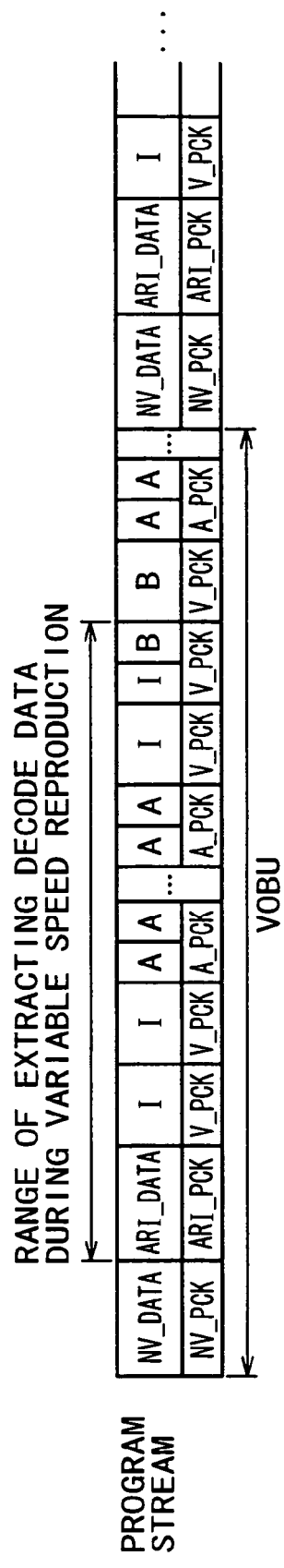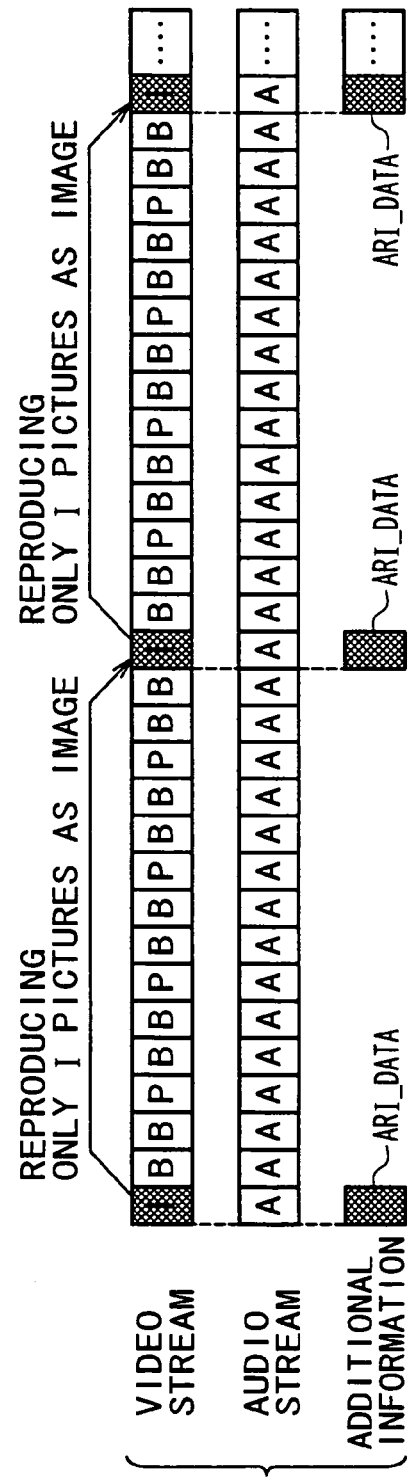
FIG. 8A
FIG. 8B

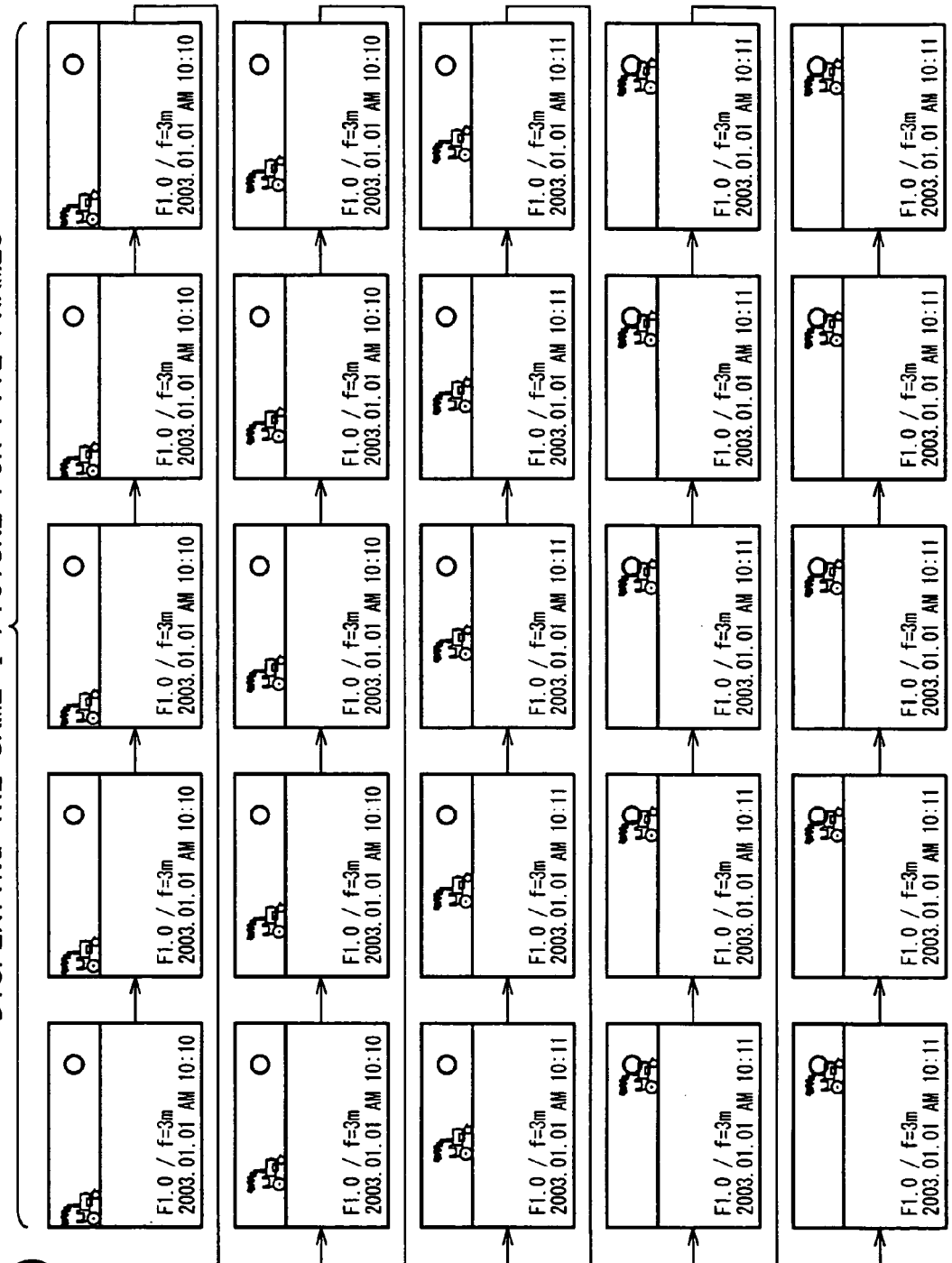

5x SPEED REPRODUCTION (ONE GOP=15 FRAMES)

DISPLAYING THE SAME I PICTURE FOR THREE FRAMES

15x SPEED REPRODUCTION (ONE GOP=15 FRAMES)

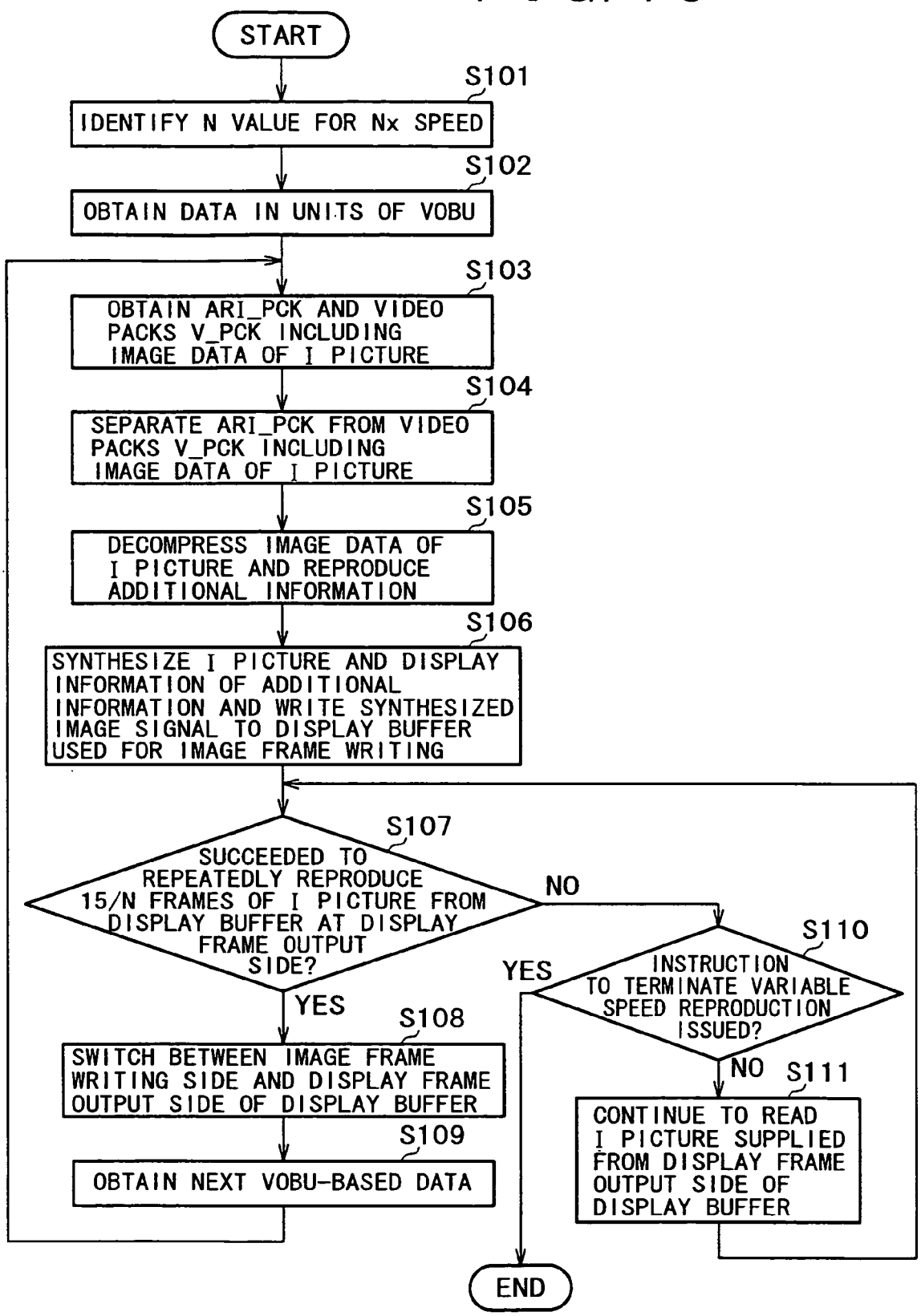

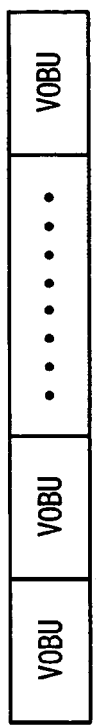
F I G. 1 4 A
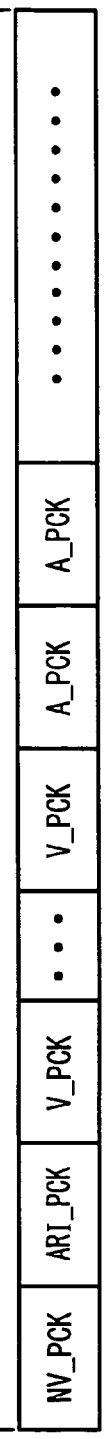
F I G. 1 4 B
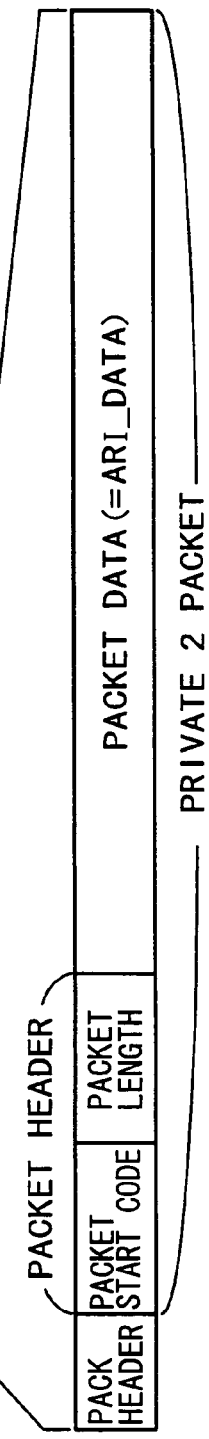
F I G. 1 4 C

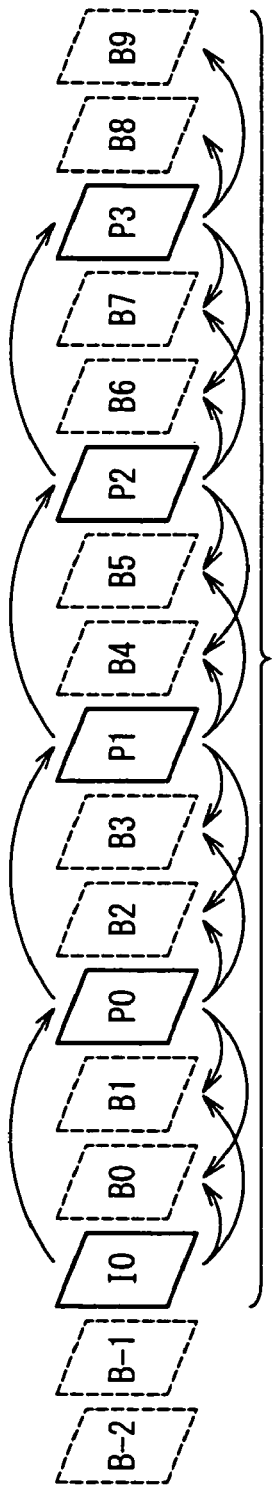
FIG. 15A  STRUCTURE OF PREDICTION BETWEEN FRAMES
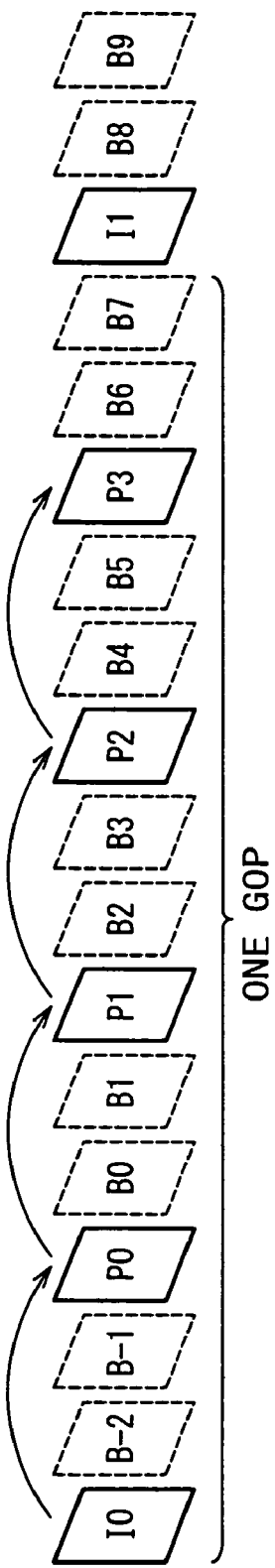
FIG. 15B  STRUCTURE OF STORED FRAMES

METHOD OF RECORDING COMPRESSED IMAGE DATA MULTIPLEXED WITH ADDITIONAL INFORMATION

BACKGROUND OF THE INVENTION

1. Field of the Invention

The present invention relates to a method and an apparatus for recording image information on recording media such as disks by means of compression and encoding and to a method and an apparatus for reproducing the same.

2. Description of Related Art

Generally, data of image information is compressed and recorded on recording media such as disks, tape, and semiconductor memory in order to write as long a period of image information in an area having a limited size.

Conventionally, there has been widely used an MPEG (Moving Picture Experts Group) compliant compression encoding system as a data compression method.

The MPEG system processes image information by means of: predictive coding using the correlation of information about an image frame (or an image field) as a decoding and reproducing unit of the image information; and data compression using DCT (Discrete Cosine Transform).

The MPEG system categorizes images in each frame or field into three types, i.e., I, P, and B pictures according to compression encoding differences. For the ease of description, only the term "frame" will be used in the description below.

The I picture is also referred to as an in-frame encoding image subject to closed compression encoding within one frame only. The P picture is also referred to as a forward predictive encoding image subject to compression encoding by using the correlation with an image frame precedent to the image frame concerned. The B picture is also referred to as a bidirectional predictive encoding image subject to compression encoding by using the correlation with image frames precedent to and subsequent to the image frame concerned.

The MPEG system uses a so-called GOP (Group of Picture) comprising a plurality of frames (e.g., 15 frames) as a unit (read/write unit) of reading and writing to recording media. FIG. 15 shows an example of GOP.

As shown in FIG. 15, the MPEG system configures the GOP to always contain at least one I picture. This is because the use of only P and B pictures cannot decode images. Since the GOP contains the I picture, a random access is made possible in units of GOPS.

The I and P pictures are encoded in the same sequence as that of original images. The B picture is encoded after the I and B pictures are encoded. In consideration for the encoding sequence, an MPEG encoder resequences images from an original sequence in FIG. 15A to a sequence in FIG. 15B. The compression encoding is applied to the resequenced image information as described in patent document 1 (see JP-A No. 214265/1996).

As indicated with arrows in FIG. 15A, the P picture is subject to the predictive encoding by using a preceding I or P picture. The B pictures are subject to the predictive encoding in units of two B pictures sandwiched between preceding and succeeding I or P pictures by using these I or P pictures.

In this manner, the B picture uses succeeding I or P pictures for encoding. As shown in FIG. 15B, the B picture is resequenced so that it follows the succeeding I or P picture to be used for the predictive encoding.

As will be discussed below, the compressed and encoded image data is provided with management information for decoding and reproduction on the basis of a decoding and reproducing unit, namely, picture-based data, and is recorded on a recording medium. During reproduction of the image data compressed in the MPEG system, the management information for decoding and reproduction is extracted from the recorded data. Based on the management information, control is provided to output the reproduced image data in units of pictures. The sequence of pictures is restored to the original sequence.

When a digital camera is used to capture a still picture, for example, it is a conventional practice to superimpose information such as the capturing date and time on a recorded image. Further, for example, patent document 2 (JP-A No. 69995/1997) discloses the method of recording camera setup data separately from image signals.

The above-mentioned patent documents are listed below.

[Patent document 1] JP-A No. 214265/1996

[Patent document 2] JP-A No. 69995/1997

Many digital cameras can capture not only still pictures, but also motion pictures. Normally, the above-mentioned MPEG system is used to compress image data of motion pictures.

When the digital camera is used to capture motion pictures, it is convenient to be able to record information such as the capturing date and time and capturing conditions such as diaphragm adjustment, exposure values, white balance states, and focal lengths on a recording medium in addition to the image information. Such additional information can be used as management information about captured images.

The above-mentioned MPEG system can synchronize and multiplex image data and audio data to produce an encoded stream. There is known the MPEG-PS (PS for Program Stream), one of system formats for recording such stream on a recording medium. However, the MPEG-PS does not define how to multiplex the above-mentioned additional information such as capturing information on streams.

It has become a technical problem how to provide the additional information to a transmission format of data recorded in the MPEG system for convenient use.

In this case, it is intended to be able to easily retrieve targeted image information points or editing points. For this purpose, it is important to make it possible to use the additional information during variable speed reproduction that reproduces image data from a recording medium faster than a normal speed.

SUMMARY OF THE INVENTION

In a state capable of satisfying the above-mentioned requirements, it is an object of the present invention to provide a method and an apparatus capable of recording additional information about image information on a recording medium.

In order to solve the above-mentioned problems, a recording method according to the present invention compresses and records data of image information on a recording medium, wherein read/write unit information as a unit of reading and writing the compressed image information to the recording medium contains a plurality of decoding and reproducing unit information comprising one frame (or one field) of the image information; and wherein at least one piece of the decoding and reproducing unit information is subject to compression encoding through the use of only image information in an associated decoding and reproducing unit. The method comprises a step of multiplexing and recording additional information about the decoding and reproducing unit information for a plurality of units within the read/write unit in the read/write unit information in an extractable manner separately from the compressed image information.

Let us consider a case of using the MPEG system for compression according to the present invention having the above-mentioned configuration. The read/write unit information containing the GOP including at least one I picture records additional information about the read/write unit information separably from the image information. Accordingly, the present invention makes it possible to extract and reproduce the additional information simultaneously with reproduction of the image information for each read/write unit.

By reproducing only I pictures in the read/write unit information, the variable speed reproduction is also capable of reproducing the additional information and superimposing it on I picture images. When information about the capturing date and time is recorded as the additional information, it is possible to perform high-speed reproduction to easily retrieve an intended image position based on the information about the capturing date and time.

The present invention makes it possible to extract and reproduce the additional information simultaneously with reproduction of the image information for each read/write unit. It is very convenient to be able to use the additional information for editing and image retrieval.

The read/write unit information contains encoding image information in the decoding and reproducing unit. This information is equivalent to the in-frame encoding image information for MPEG, i.e., the I picture. Reproducing only that encoding image information makes it possible to reproduce and display the additional information on an image according to the encoding image information in the decoding and reproducing unit also during variable speed reproduction. When information about the capturing date and time is recorded as the additional information, it is possible to perform high-speed reproduction to easily retrieve an intended image position based on the information about the capturing date and time.

BRIEF DESCRIPTION OF THE DRAWINGS

FIG. 6 shows an example of additional information recorded by the embodiment of the recording method according to the present invention;

FIG. 7 shows a configuration example of data separation and decoding sections in FIG. 1;

FIG. 8 illustrates the embodiment of the reproducing method according to the present invention;

FIG. 9 illustrates the embodiment of there producing method according to the present invention;

FIG. 13 shows a flowchart for describing the embodiment of the reproducing method according to the present invention;

FIG. 14 illustrates another example of the embodiment of the recording method according to the present invention; and FIG. 15 illustrates a GOP configuration according to the MPEG system.

DETAILED DESCRIPTION OF THE PREFERRED EMBODIMENTS

Embodiments of the recording method and the reproducing method according to the present invention will be described in further detail with reference to the accompanying drawings. For the purpose of exemplification, the embodiments are applied to a digital camera as an imaging apparatus using an optical disk as a recording medium.

The example uses writable optical disks such as DVD-R (Digital Versatile Disc-Recordable) and DVD-RW (Digital Versatile Disc-ReWritable). The MPEG2 technology is used for data compression. Data is recorded in the MPEG2-PS (MPEG2 Program Stream) format. A DVD-Video formatted optical disk is used to record MPEG-PS data.

Figure 1:
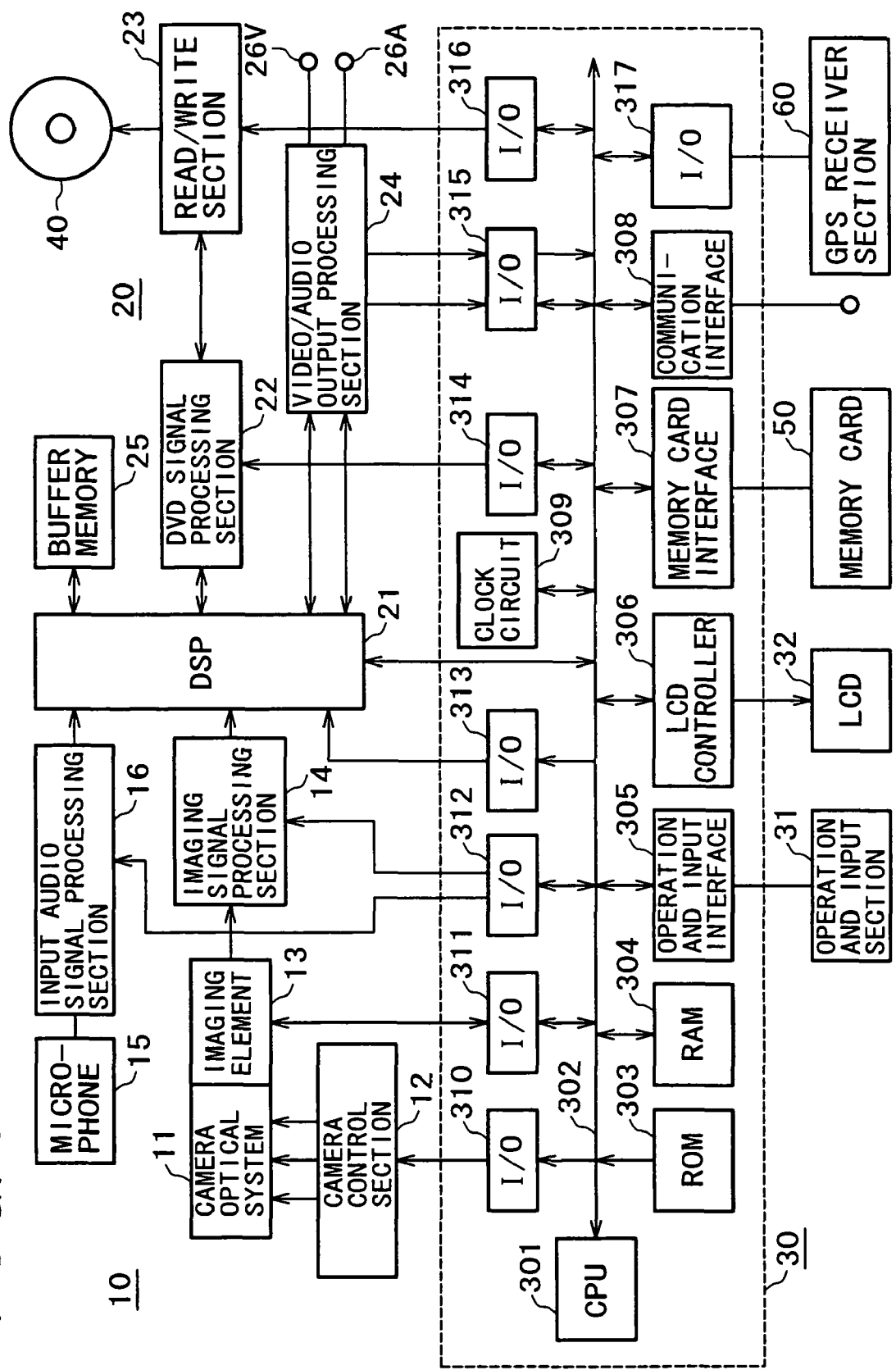
FIG. 1 shows a configuration example of an imaging apparatus to which an embodiment of a recording method according to the present invention is applied.

FIG. 1 is a block diagram showing a configuration example of the digital camera according to the embodiment. In this example, the digital camera comprises a camera section 10, a recording and reproducing section 20, and a control section 30.

The control section 30 comprises a CPU (Central Processing Unit) 301 connecting with a system bus 302 that is further connected with: program ROM (Read Only Memory) 303; RAM (Random Access Memory) 304 for a work area; an operation and input interface 305 for connecting with an operation and input section 31; an LCD controller 306 for connecting with an LCD (Liquid Crystal Display) 32 as a display apparatus; a memory card interface 307 for mounting a memory card 50; a communication interface 308 such as a USB (Universal Serial Bus); a clock circuit 309; and I/O ports 310, 311, 312, 313, 314, 315, 316, and 317.

The ROM 303 stores a program for controlling the camera section 10 and the other programs for controlling the recording and reproduction of captured image information and audio information from a microphone 15.

The operation and input section 31 is provided with a plurality of keys such as a mode selection key to select an imaging mode or a reproduction mode; a zoom adjustment key; an exposure adjustment key; a shutter key; a motion picture capturing key; and a white balance adjustment key.

The CPU 301 analyzes an operation signal supplied from the operation and input section 31 via the operation and input interface 305, determines which of the keys on the operation and input section 31 is operated, and performs a control process according to the determination result.

Under control of the CPU 301, the LCD 32 displays not only an object image and capturing conditions during capturing, but also images reproduced from a recording medium and additional information.

The clock circuit 309 measures a clock signal from a reference clock signal generation circuit (not shown) and generates time information indicative of year, month, day, hour, minute, and second. The clock circuit 309 is configured to generate information as accurate as the decimal place so as to be able to count images in units of frames.

The digital camera according to the example is configured to be able to record data not only on an optical disk 40, but also on the memory card 50. In the latter case, the memory card 50 records compressed data via the memory card interface 307.

The communication interface 308 is used to connect the digital camera according to this example with a personal computer for interchanging recorded data or other data.

The camera section 10 comprises: a camera optical system 11; a camera control section 12; an imaging element 13; an imaging signal processing section 14; a microphone 15; and an input audio signal processing section 16.

Though not shown, the camera optical system 11 is provided with a group of lenses, a diaphragm adjustment mechanism, a focus adjustment mechanism, a zoom mechanism, a shutter mechanism, a flash (strobe light) mechanism for capturing objects as well as a camera shake correction mechanism.

The camera shake correction mechanism has a gyroscope that detects angular velocity information ω (varying angle θ/second). The detected angular velocity information is used to detect a camera shake. The optical correction mechanism corrects the detected camera shake amount. If the camera shake value exceeds the correction limit, the camera shake correction mechanism turns on a flag indicative of this condition.

For example, the camera shake correction mechanism is supplied with angular velocity information ω from the gyroscope at a specified time interval (e.g., 8 times in 1/60 seconds) and time-integrates this angular velocity information ω from the beginning of recording. If the integration value θ exceeds a specified angle, e.g., 5 degrees, the camera shake correction mechanism turns on a camera shake correction limit flag. The angular velocity information ω is assumed to be +ω if the camera shake deviates from the reference position along one direction or is assumed to be −ω if the camera shake deviates along the other direction. There is provided a threshold value, e.g., ±5 degrees, in both + and − directions as detection limits for the camera shake correction.

The camera control section 12 receives a control signal from the I/O port 310 in the control section 30 to generate a control signal to be supplied to the camera optical system 11. The camera control section 12 supplies the generated control signal to the camera optical system 11 for providing zoom control, shutter control, and exposure control. Signals supplied from the I/O port 310 in the control section 30 include not only a control signal corresponding to a realtime operation and input from the operation and input section 31, but also a control signal based on capturing conditions predetermined in accordance with operations and inputs from the operation and input section 31.

In this example, the imaging element 13 comprises a CCD (Charge Coupled Device) and uses its image formation surface to form an image transmitted from the camera optical system 11. The imaging element 13 receives an image capture timing signal generated from the I/O port 311 in the control section 30 in response to a user action such as a shutter operation, converts the object image formed on the image formation surface into an imaging signal, and supplies this signal to the imaging signal processing section 14.

Based on the control supplied from the I/O port 312 in the control section 30, the imaging signal processing section 14 performs processes such as applying gamma correction or AGC (Auto Gain Control) to imaging signals as well as converting these signals into digital signals.

The microphone 15 collects sounds around the object during capturing. An audio signal from the microphone 15 is supplied to the input audio signal processing section 16.

Based on the control supplied from the I/O port 312 in the control section 30, the input audio signal processing section 16 performs processes such as applying correction or AGC (Auto Gain Control) to input audio signals as well as converting these signals into digital signals.

Though not shown in FIG. 1, the digital camera according to this example is provided with an external microphone terminal. When an external microphone is connected to the external microphone terminal, the input audio signal processing section 16 is configured to automatically select an audio signal supplied from the external microphone instead of the built-in microphone 15.

In this example, the input audio signal processing section 16 performs the AGC process in consideration for different characteristics depending on whether an audio signal is input from the built-in microphone 15 or from the external microphone. The selection of the AGC process is configured to be interlocked with selection of audio signal input to the input audio signal processing section 16.

The recording and reproducing section 20 comprises: a DSP (Digital Signal Processor) 21; a DVD signal processing section 22; a read/write section 23; and a video/audio output processing section 24. The DSP 21 connects with buffer memory 25 comprising, e.g., SDRAM (Synchronous DRAM).

The DSP 21 is supplied with a digital image signal from the imaging signal processing section 14 and a digital audio signal from the input audio signal processing section 16 in addition to the information during capturing via the I/O port 313 in the control section 30. This capturing information supplied via the I/O port 313 includes the capturing time in units of frames and capturing condition information.

In this example, time information is read as the capturing time information from the clock circuit 309 as needed. In addition, it may be preferable to read the time information (capturing start time) from the clock circuit 309 at the beginning of capturing a motion picture, and thereafter use relative times in units of frames (or frame numbers) as capturing times with reference to the capturing start time.

The capturing condition information includes both automatically specified information and user-specified information. For example, the capturing condition information includes setup information such as exposure control information, automatic white balance adjustment information, digital zoom magnification information, camera shake correction information, F value (F number), exposure time, AGC gain value, and lens focal length.

The capturing information may include information about whether to use the built-in microphone 15 or the external microphone as a means for collecting audio information.

According to the embodiment, the above-mentioned capturing information is generated and recorded as additional information in units of GOP.

Based on camera information supplied via the I/O port 313, the DSP 21 provides a digital image signal from the imaging signal processing section 14 with automatic white balance control, control for the exposure correction, and control corresponding to digital zoom magnifications. The DSP 21 uses the MPEG2 technology to compress data of digital image signals provided with these controls and digital audio signals from the input audio signal processing section 16.

The DSP 21 performs an additional information process for recording the input capturing information as additional information along with the compressed image data and the compressed audio data.

Further, the DSP 21 multiplexes the compressed image data, the compressed audio data, and the additional information to create a data sequence compliant with the MPEG2-PS format.

The MPEG2-PS format data from the DSP 21 passes through a recording signal processing section in the DVD signal processing section 22 under control of the control section 30 via the I/O port 314 and then is supplied to the read/write section 23. The read/write section 23 writes the MPEG2-PS format data to a DVD 40. The read/write section 23 is subject to control of the control section 30 via the I/O port 316.

The read/write section 23 reads data from the DVD 40. This data passes a reproduction signal processing section in the DVD signal processing section 22 and is supplied to the DSP 21.

The DSP 21 separates the multiplexed compressed image data, compressed audio data, and additional information from each other. The DSP 21 decompresses the separated compressed image data, reproduces the originally sequenced image data in units of frames, and outputs this data to the video/audio output processing section 24. In addition, the DSP 21 decompresses the separated compressed audio data, reproduces the audio data, and outputs this data to the video/audio output processing section 24.

Under control of the control section 30 via the I/O port 315, the video/audio output processing section 24 processes image data and audio data to be output. The video/audio output processing section 24 supplies image data and audio data as digital data to the control section 30 via the I/O 315 and D/A—converts these types of data into analog signals to output them to output terminals 26V and 26A. A reproduction image comprising image data is input to the control section 30 via the I/O port 315 and then is reproduced and displayed on a screen of the LCD 32 under control of the LCD controller 306.

In this example, a GPS receiver section 60 is connected to the system bus 302 via the I/O port 317. Positional information from the GPS receiver section 60 is input to the control section 30 via the I/O port 317. During recording, the positional information is recorded in accordance with data for the captured image.

During reproduction, the example can display a capturing position together with a reproduction image. Further, it is possible to use the recorded positional information during capturing to display a track during capturing on a displayed map screen.

It may be also preferable to obtain positional information from public base stations or networks using a communication means instead of providing the GPS receiver section 60.

[Data Compression and Multiplexing]

Figure 2:
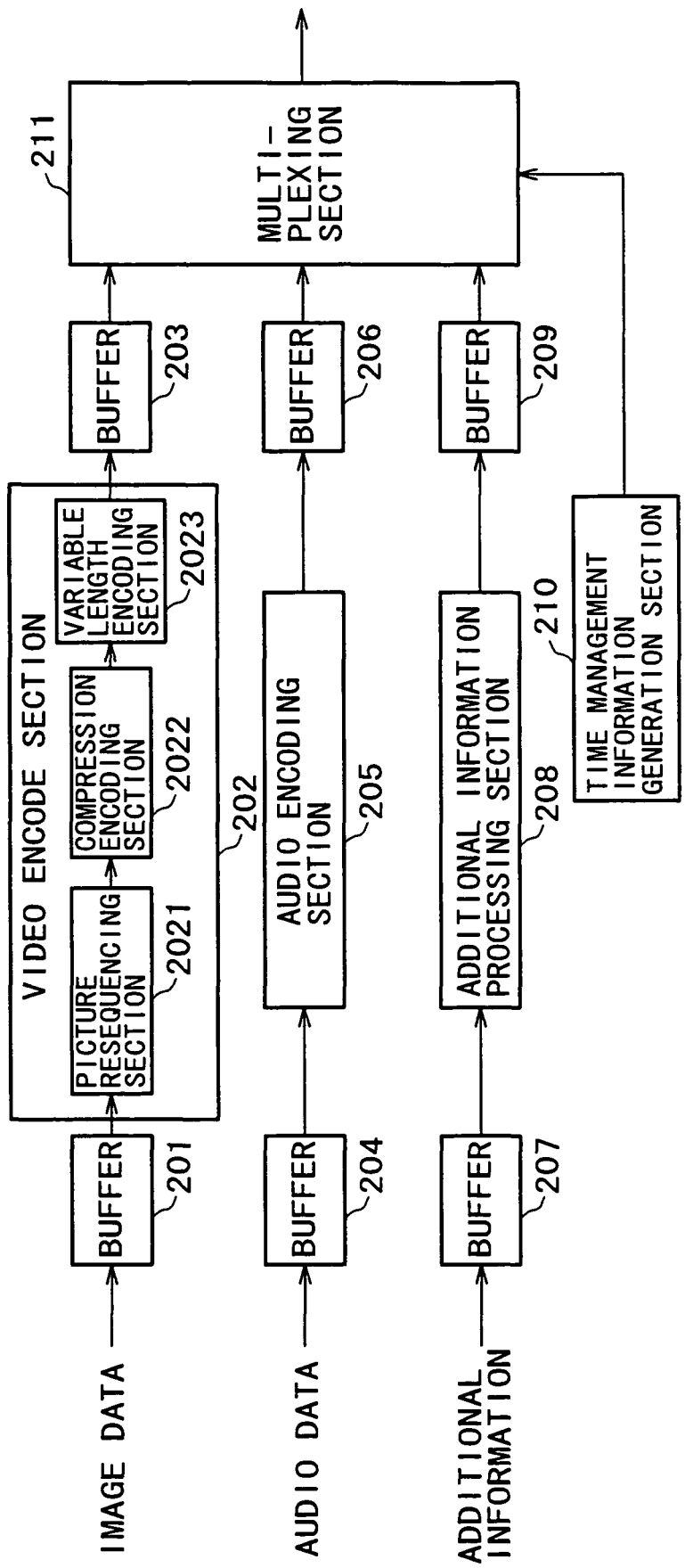
FIG. 2 illustrates a configuration example of data encode and multiplexing sections in FIG. 1.

Referring now to FIG. 2, the following describes data compression and multiplexing in the DSP 21.

As mentioned above, the DSP 21 applies control processes to image data from the imaging signal processing section 14 according to the setup condition and the control condition at the time of capturing. The image data is supplied to the (a) video encode section 202 via the buffer 201.

The video encode section 202 configures a GOP comprising at least one I picture, a plurality of P pictures, and a B picture. The video encode section 202 uses the GOP as a unit of writing to a DVD as a recording medium for compression.

As mentioned above with reference to FIG. 15, the video encode section 202 first uses a picture resequencing section 2021 to rearrange the sequence of pictures in the GOP.

Then, the video encode section 202 uses a compression encoding section 2022 to compress data for the I picture by performing in-frame encoding. The compression encoding section 2022 compresses data for the P picture by performing inter-frame predictive encoding that uses correlation with a preceding I or P picture. The compression encoding section 2022 compresses data for the B picture by performing inter-frame predictive encoding that uses correlation with preceding and succeeding I or P pictures. The P picture may contain image portions that need the in-frame encoding.

After the compression encoding section 2022 performs compression and encoding for image data as mentioned above, a variable length encoding section 2023 performs variable length encoding by using Hoffman coding for that image data. The image data then passes through a buffer 203 and then is supplied to a multiplexing section 211.

Audio data from the input audio signal processing section 16 is incorporated into the DSP 21 in synchronization with imaging timing. The audio data passes a buffer 204 and is supplied to an audio encoding section 205. The audio data is compressed and encoded in units of a specified amount of audio data (called audio frames) as a decoding and reproducing unit. The compressed and encoded audio data passes a buffer 206 and is supplied to a multiplexing section 211.

Further, the DSP 21 is supplied with capturing information from the I/O port 313. The capturing information passes a buffer 207 and is supplied to an additional information processing section 208 to generate additional information to be attached to each frame of the image. The generated additional information passes a buffer 209 and is supplied to the multiplexing section 211.

The multiplexing section 211 packetizes to multiplex image data, audio data, and additional information. In this case, the multiplexing section 211 attaches a pack header to one or more pieces of packet data for a blocking purpose and configures a pack. Multiplexed data output from the multiplexing section 211 is output to the DVD signal processing section 22. The read/write section 23 writes that data to the DVD 40 as mentioned above.

For synchronization between image data and audio data, the MPEG system attaches management information called a time stamp to each decoding and reproducing unit of image data or audio data, i.e., in units of frames for image data or in units of audio frames for audio data.

The time stamp information is supplied from a time management information generation section 210 to the multiplexing section 211. The time stamp is given a time reference based on the SCR (System Clock Reference).

The multiplexing section 211 attaches the time stamp to the packet header of a packet that contains the beginning of decoding and reproducing unit information. No time stamp is attached to the packet header of a packet that does not contain the beginning of decoding and reproducing unit information.

Two types of time stamps are available: PTS (Presentation Time Stamp) and DTS (Decoding Time Stamp).

The PTS is time management information about reproduction output of the decoding and reproducing unit information. That is to say, the PTS is time management information about when to reproducibly output the decoding and reproducing unit information.

The time stamp DTS is time management information about decoding of the decoding and reproducing unit information. As mentioned above, the MPEG system rearranges a sequence of pictures during encoding to make the reproduction output sequence and the decoding sequence different. The time stamp DTS is provided as a countermeasure for this characteristic.

When there is a difference between the time stamps PTS and DTS, both time stamps are attached to the packet header. When they match, only the time stamp PTS is attached to the packet header.

As mentioned above, the time stamp PTS corresponds to an original sequence of frames for the image data and functions as time management information for each frame based on one-to-one correspondence. Audio data is provided with only the time stamp PTS, not the time stamp DTS.

[First Example of Multiplexing Additional Information]

Figure 3:
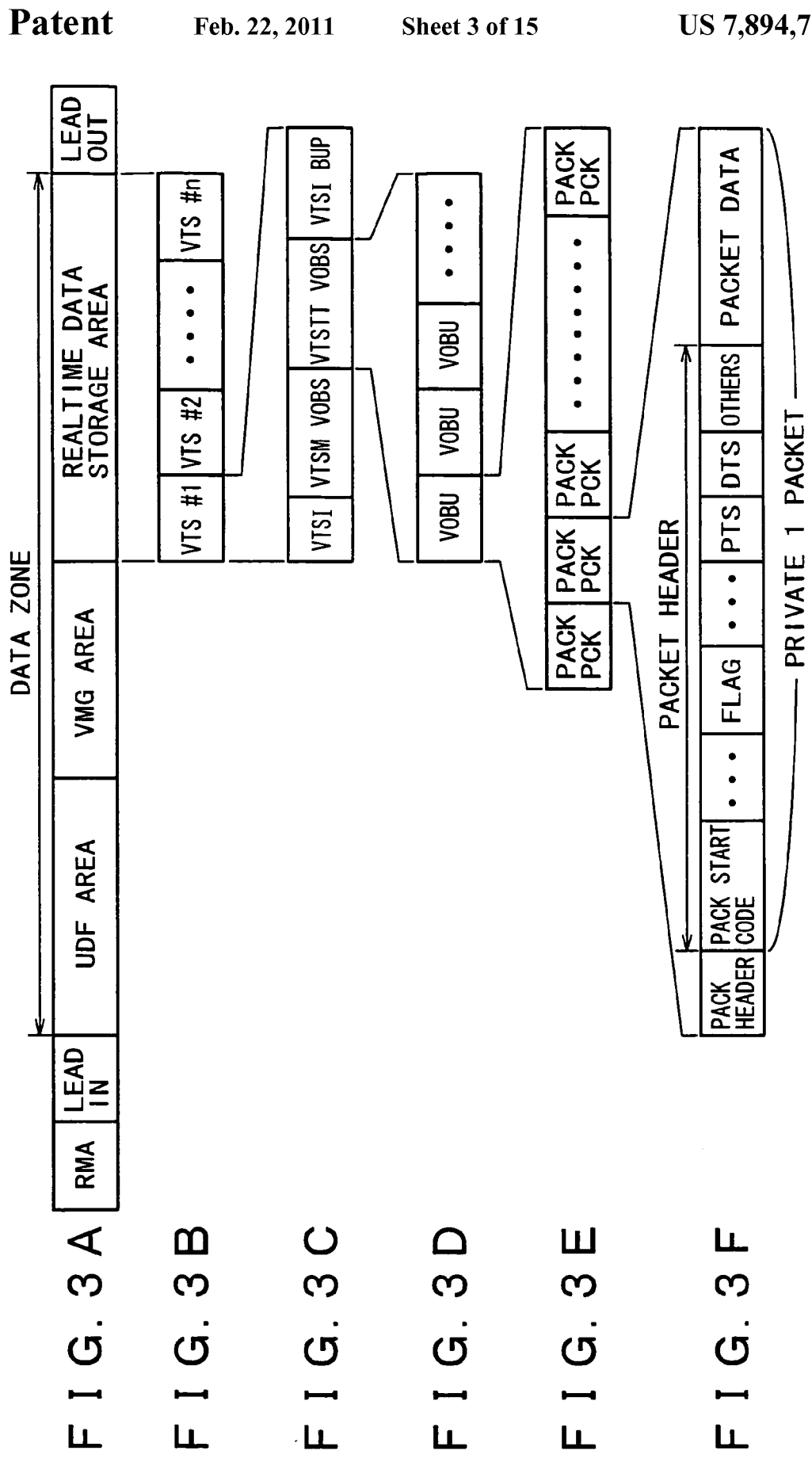
FIG. 3 shows logical arrangement of data on an optical disk according to the DVD-Video format.

The first example shows a case of recording data using the DVD-Video format. FIG. 3 shows logical arrangement of data recorded on an optical disk according to the DVD-Video format.

As shown in FIG. 3A, recording areas on an optical disk comprises a lead-in area, a data zone area, and a lead-out area in order from the innermost side of the optical disk along its radial direction. The data zone area records data such as the management information, image data, and the like.

The data zone area is divided into a UDF (Universal Disc Format) area, a VMG (Video ManaGer) area, and a realtime data recording area in order from the lead-in area side. The UDF area and the VMG area record the management information for managing files such as image data recorded on the optical disk. The UDF supports the UDF and ISO9660 standards to enable computers to read optical disks. The VMG area records the DVD management information.

The realtime data recording area records image data and audio data. As shown in FIG. 3B, the realtime data recording area records data in units of data groups called VTS (Video Title Set).

As shown in FIG. 3C, the VTS comprises VTSI (Video Title Set Information), VTSM_VOBS (Video Object Set For the VTSM), VTSTT_VOBS (Video Object Set For Titles in a VTS), and VTSI_BUP (Backup of VTSI).

As shown in FIG. 3D, VTSTT_VOBS records compressed data according to the MPEG2-PS format in units of information blocks called VOBUs (Video Object Units) as units of reading and writing. In the VOBU, image data includes one GOP containing at least one picture. Audio data includes information corresponding to the GOP. This is equivalent to reading and writing data in units of GOPs on the optical disk. According to the embodiment, the VOBU also includes additional information about the image data for one GOP to be described later.

VTSI records management information such as recording position information about image data and the like. VTSM_VOBS records a root menu for image data and the like. VTSM_VOBS is optional. VTSI_BUP maintains backup information about VTSI.

As shown in FIG. 3E, the read/write unit data VOBU comprises a plurality of packs PCK. Each pack PCK can comprise one or more packets. In this example, one pack comprises one packet. According to the DVD-Video format, one pack is defined to comprise 2048 bytes (equivalent to one sector).

FIG. 3F illustrates one pack in this example. The pack PCK begins with a pack header. The pack header is followed by a packet header, then by packet data comprising image data and audio data. A pack containing image data as packet data is referred to as a video pack. A pack containing audio data as packet data is referred to as an audio pack. A packet format for this image data or audio data is defined to be private 1 packet.

In this specification, a pack containing image data as packet data is referred to as a video pack. A pack containing audio data as packet data is referred to as an audio pack.

The pack header of each pack contains the above-mentioned time reference information SCR. The packet header begins with a packet start code. The packet header contains flag information such as PTS and DTS flags and time stamps PTS and DTS. The PTS and DTS flags indicate whether or not the packet contain the time stamps PTS and DTS. As mentioned above, the time stamps PTS and DTS are attached to the packet header of a packet that contains the beginning of pictures.

When the computer accesses an optical disk that is recorded in the above-mentioned format, the UDF area information is used to retrieve and reproduce an intended file. When this optical disk is reproduced on a DVD player, the UDF area information is used to retrieve the beginning of the VMG area. The VMG area information is used to retrieve and reproduce an intended title.

For example, technologies for writing video data on DVD-RW (DVD Re-Recordable) optical disks include the Incremental Recording system (hereafter referred to as the INC system) and the Restricted Overwrite system (hereafter referred to as the ROW system).

The INC system sequentially records data. The ROW system is applied for over writable optical disks. The ROW system also sequentially records data on an unused area.

The INC and ROW systems use an RMA (Recording Management Area) to maintain management information about the entire optical disk such as recording area reservation inside the lead-in area.

According to the finalization, the INC and ROW systems form not only the UDF and VMG areas, but also the lead-in and lead-out areas, providing compatibility with the DVD-Video format generally used for read-only DVD-ROM.

According to this example, the additional information is multiplexed as one-pack information per VOBU. In the description below, a pack containing the additional information as packet data is referred to as an additional information pack.

In this example, the GOP contains one I picture. The additional information is processed as the capturing information such as setup conditions at the time of capturing an I picture frame as an imaging signal.

Further, this example applies the private 1 packet format to an additional information packet in the additional information pack. According to the example, the additional information packet contains the same time stamp PTS as that attached to the video pack at the beginning of image data for the corresponding I picture.

The additional information pack is multiplexed at a specified location in the VOBU. The location is specified in a sequence of packs (including the beginning or end of the I picture) of compressed data for the I picture. Normally, image data for the I picture is contained in a plurality of video packs. For example, the additional information pack is multiplexed before the first video pack or after the last video pack in the plurality of video packs for the I picture.

As other examples, the location of multiplying the additional information pack may be allowed not only at the beginning or end of video packs for the I picture, but also before or after a specified pack from the beginning of video packs of image data for the I picture. Moreover, it may be preferable to multiplex the additional information pack at the end of VOBUs instead of the vicinity of the I picture. This is because reading and writing operations are performed in units of VOBUs. The additional information pack may be disposed in a predetermined location in the middle of the VOBU.

During variable speed reproduction, as will be discussed below, an image is reproduced by extracting only the I picture portion in the VOBU. If the additional information pack is multiplexed at a specified location in the I picture including the beginning and the end thereof as mentioned above, it becomes easy to extract and reproduce the I picture together with the additional information while extracting only the I picture in the targeted VOBU.

Figure 4:
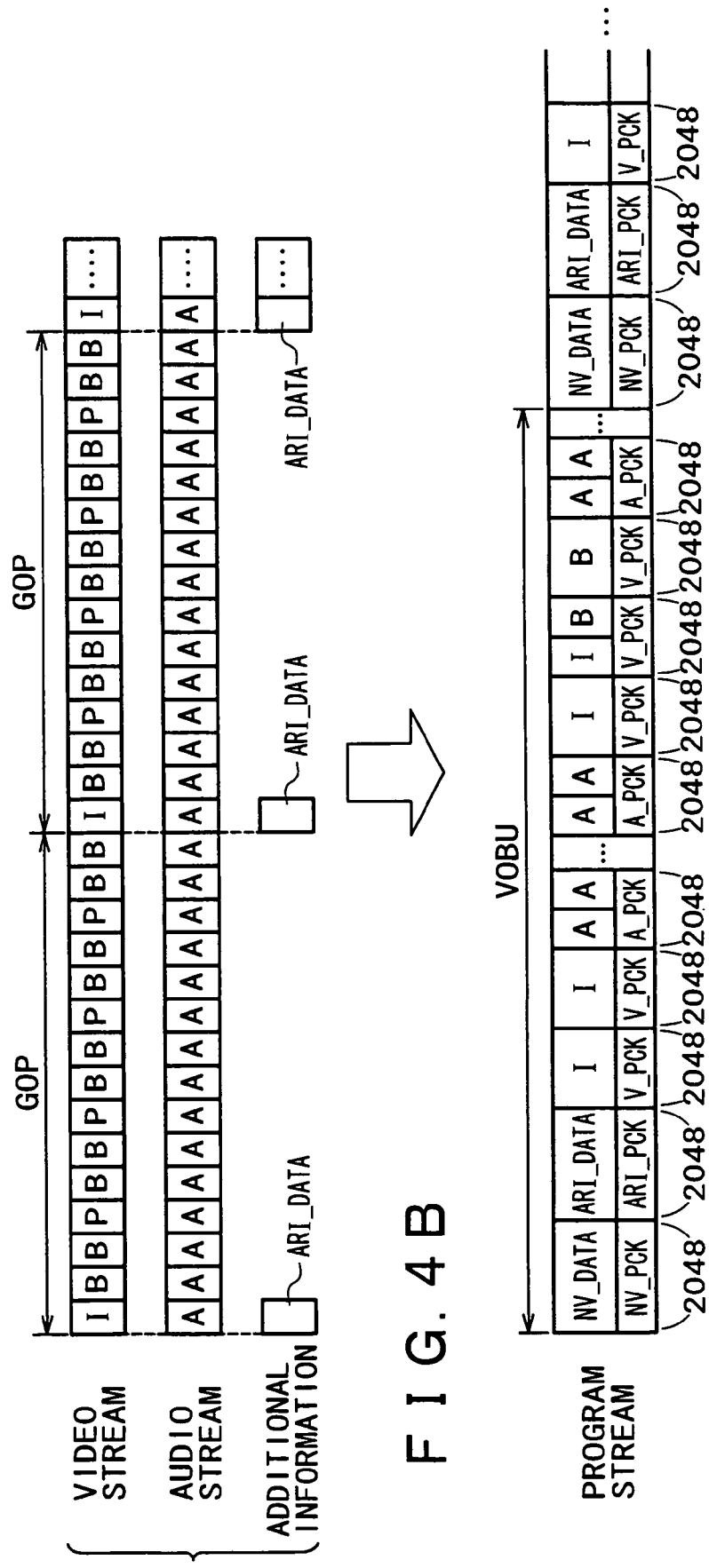
FIG. 4 shows an example of major part in an embodiment of a recording method according to the present invention.

FIG. 4 diagrams how to multiplex image data, audio data, and additional information for one GOP. In this example, one GOP comprises 15 frames (i.e., 15 pictures). In addition, the example multiplexes the capturing information about image data for the I picture as the additional information.

FIG. 4A shows a stream of image data, audio data, and additional information input to the buffers 201, 204, and 207. FIG. 4B shows a stream structure in one MPEG-PS formatted VOBU from the multiplexing section 211.

The image data stream in FIG. 4A uses B, I, and P to indicate image data in units of frames in consideration for picture types I, B, and P representing the I, B, and P pictures, respectively. The audio stream in FIG. 4A uses A to indicate audio data corresponding to each image frame.

According to the example, the additional information ARI_DATA in FIG. 4A shows the additional information comprising the capturing information at the time of capturing the I picture in image data equivalent to one GOP as mentioned above. In this example, the additional information ARI_DATA represents unchangeable data during a period of one GOP.

As mentioned above, the video encode section 202 resequences the pictures for the image data in FIG. 4A. The image data is processed by compression encoding and variable length encoding, and then is supplied to the multiplexing section 211. As shown in FIG. 4B, the multiplexing section 211 multiplexes the compressed image data for each picture into one or more video packs V_PCK. At this time, the multiplexing section 211 provides the image data for each picture with the time stamp PTS as the time management information for reproduction output. More specifically, the time stamp PTS is contained in the header of a packet that includes the beginning of pictures.

In FIG. 4B, symbols I, B, and P in rectangles of each video pack V_PCK represent picture types such as I, B, and P pictures for the compressed data in the image pack.

The audio encoding section 205 compresses the audio data in FIG. 4A according to the MPEG audio format. The compressed data is supplied to the multiplexing section 211. As shown in FIG. 4B, the multiplexing section 211 multiplexes the compressed data as an audio pack A_PCK for the specified amount of data between video packs V_PCK.

With respect to each audio data, the multiplexing section 211 places the time stamp PTS, i.e., the time management information for reproduction output, in the packet header for each audio frame. When one packet contains a plurality of frames, the time stamp PTS for the first frame is inserted into the packet header.

The additional information ARI_DATA in FIG. 4A is subject to the above-mentioned signal processing in the additional information processing section 208, and then is supplied to the multiplexing section 211. The multiplexing section 211 forms one additional information pack ARI_PCK per GOP. As shown in FIG. 4B, the additional information pack ARI_PCK according to the example is multiplexed at the beginning of a plurality of image packs for the I picture in the VOBU.

As mentioned above, the additional information pack ARI_PCK contains the packetized additional information ARI_DATA. Its packet header contains the same time stamp PTS as that contained in the packet of the first packet for the I picture in the same GOP.

The VOBU containing data of one GOP begins with a pack NV_PCK called a navigation pack. It contains reproduction management information such as data search information (e.g., control information indicating to which sector a jump operation should be pointed). As shown in FIG. 4B, the additional information pack ARI_PCK is multiplexed immediately after the navigation pack NV_PCK.

[Second Example of Multiplexing Additional Information]

Figure 5:
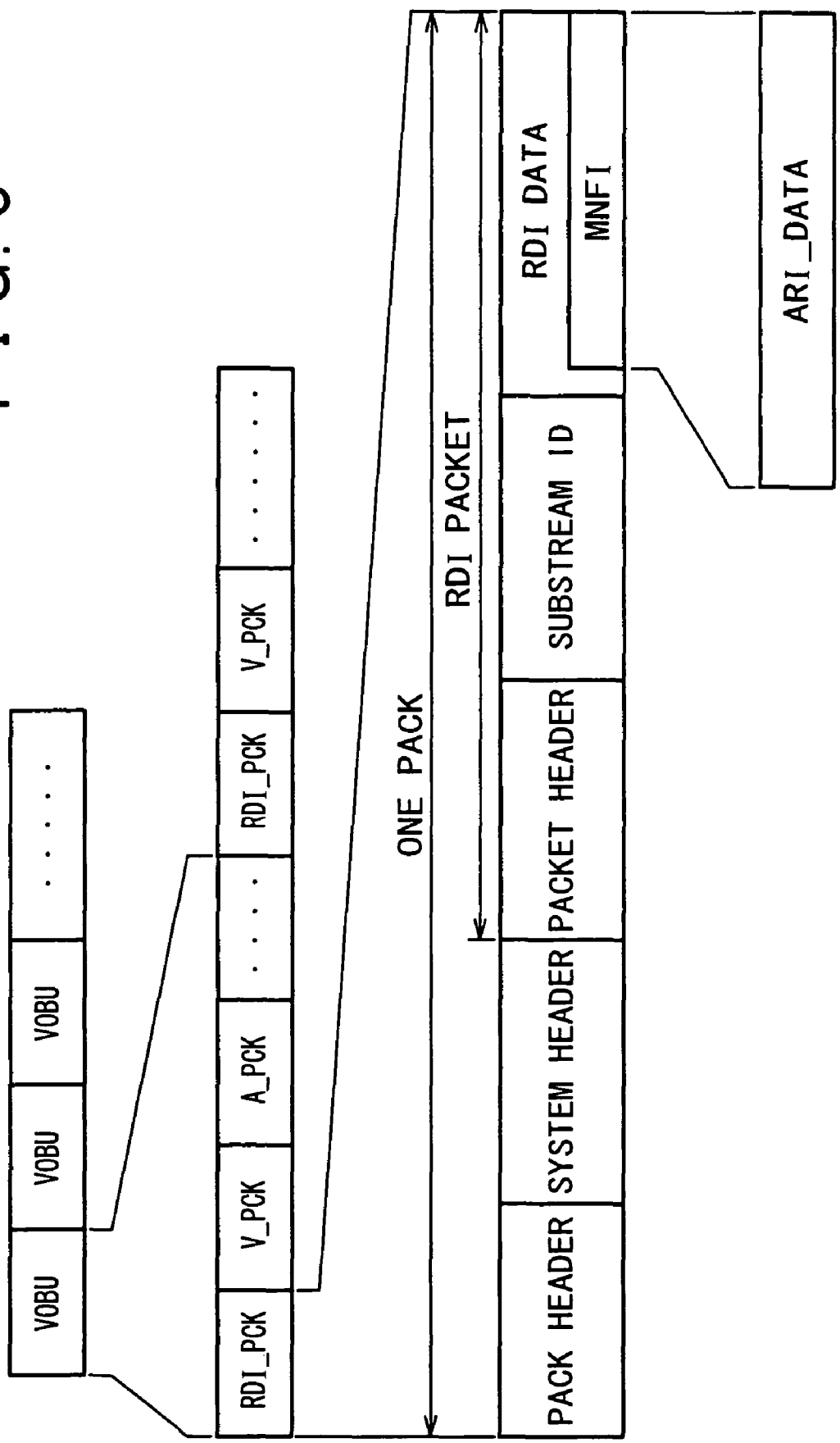
FIG. 5 shows another example of major part in the embodiment of the recording method according to the present invention.

The second example relates to recording in the DVD-Video Recording (DVD-VR) format. The DVD-VR format is almost the same as the above-mentioned DVD-Video format except a slight difference in the structure comprising a plurality of packs PCK (2048 bytes) constituting the VOBU. FIG. 5 shows a pack structure in the VOBU according to the DVD-VR format.

the VOBU according to the DVD-VR format begins with an RDI pack RDI_PCK (RDI; Real-time Data Information) followed by video packs V_PCK and audio packs A_PCK.

As shown in FIG. 5, the beginning pack RDI_PCK comprises a pack header, a system header, and an RDI packet. The pack header is the same as that in FIG. 3. For example, the system header contains data for identifying attributes such as a bit rate, the number of video channels, and the number of audio channels. The system header also contains an instruction to control the MPEG system and control data such as a buffer area size for a multiplexing section to be described (a means for decomposing multiplexed data in the reproduction system).

The system header is followed by an RDI packet comprising 2003 bytes, for example. The RDI packet comprises a packet header, a substream ID, and RDI data. The substream ID is an identifier that identifies the packet to be an RDI packet.

There are available RDI_GI (Real-time Data Information General Information) and DCI_CCI (Display Control Information and Copy Control Information) defined as RDI data. The RDI_GI is 16-byte data containing the recording time for the VOBU. The DCI_CCI is 8-byte data containing the display control information and the like. The remaining 1979-byte area of the 2003-byte RDI data area has a field name MNFI (Manufacturer's Information) and is reserved for a developer (manufacturer).

According to the second example, like the first example, the area having the field name MNFI is provided with the additional information ARI_DATA about image data for the I picture in the VOBU containing the RDI pack.

The RDI pack must be read whenever data is read in units of VOBUs. If data is recorded as well as the additional information contained in the RDI pack, it is possible to easily extract and reproduce the additional information together with image data and the like not only during normal speed reproduction, but also during variable speed (high speed) reproduction in the second example like the first example.

[Example of Additional Information ARI_DATA]

FIG. 6 shows an example of ARI_DATA in the pack ARI_PCK according to the DVD-Video format or ARI_DATA in the RDI pack according to the DVD-Video Recording format as mentioned above.

In FIG. 6, RBP (Reference Byte Position) indicates relative byte positions in a packet and specifies the beginning of the additional information ARI_DATA to be "0".

As shown in FIG. 6, the additional information ARI_DATA comprises an additional recording identifier, application information, recording time information, and camera information.

The additional recording identifier is used to identify data in the packet to be the additional information (additional recording information) and contains an additional recording information data identifier and its version number.

The application information contains a vendor name as a product's manufacturer, a product name, an application ID, and developer data (Manufacturer's Information Data).

The application ID provides information for identifying the recording system at the time of recording. In this example, "00h" indicates that data is recorded in the DVD-Video format, where "h" denotes the hexadecimal notation; "01h" indicates that data is recorded in the DVD-Video Recording format.

The developer data is an area to be freely used by developers and records debug data during the development, for example.

The recording time information records a time zone (having the field name VOBU_LCL_TM_ZONE as will be represented likewise in the following description) for recording the additional information ARI_DATA and a recording time (VOBU_REC_TM) of the additional information ARI_DATA with respect to the VOBU containing the additional information.

In this example, the recording time (VOBU_REC_TM) of the additional information ARI_DATA indicates the time of capturing frames for the I picture. The example represents the recording time in the form of year, month, day, hour, minute, and second.

The time zone (VOBU_LCL_TM_ZONE) for recording the additional information ARI_DATA records a time zone for the recording time (VOBU_REC_TM) of the additional information ARI_DATA. Here, the time zone signifies an offset from the UTC (Coordinated Universal Time) configured by a user for the device, i.e., a time difference corresponding to the time (local time) of a country that uses the recording apparatus.

It is possible to use the universal time (the official time worldwide used to record the time) as the recording time (VOBU_REC_TM) for the additional information ARI_DATA. In this case, the time zone (VOBU_LCL_TM_ZONE) for recording the additional information ARI_DATA is set to zero.

The camera information to follow records information such as setup conditions. As shown in FIG. 6, the camera information includes F number, exposure time, exposure program, exposure program extended information, exposure correction value, AGC gain value, lens minimum F value, flash, lens focal length, individual image processing, white balance, capturing scene type, focus mode, object distance, camera shake correction, digital zoom magnification, and the like.

The exposure program (EXP_PRG) records a class of the exposure program used for the camera at the time of capturing. There are four types of exposure program classes: no specification (Not Specified), manual, normal program, and preset.

The exposure program extended information (EXP_PRG_EX) records detailed information when the preset class is specified for the exposure program used for the camera at the time of capturing. When the exposure program is not configured to be the preset class, no specification (Not Specified) is assumed. When the exposure program is configured to be the preset class, any of gain preference, shutter preference, and exposure preference takes effect.

The AGC gain value field records a value of the AGC gain in the signal processing system. The flash field (FLS) records strobe states at the time of capturing such as flash-on, flash-off, red-eye reduction flash, and forced flash.

The individual image processing (CST_REN) records that image data is subject to an exceptional image process such as lettering in consideration for output.

The white balance (WHT_BAL) records white balance adjustment modes specified at the time of capturing. Available white balance adjustment modes include "automatic", "HOLD", "manual", "candle", "incandescent lamp", "fluorescent lamp at low color temperature", "fluorescent lamp at high color temperature", "sunlight", "cloudiness", and "no specification".

The capturing scene type (SCN_CAP_TYP) records object types specified at the time of capturing. In this example, available capturing scene types include "standard", "landscape", "portrait", "night scene", and "no specification".

The focus mode (FCS_MOD) records focus modes such as "automatic focus", "manual focus", and "no specification" specified at the time of capturing.

The camera shake correction (IMG_STB) records "camera shake correction on", "camera shake correction off", or "no specification" indicating whether or not the camera shake correction function is applied.

The digital zoom magnification (DIG_ZOM) records the digital zoom magnification used at the time of capturing. When no digital zoom is used, this field records "00h".

The positional information (GPS_INFO) records the positional information obtained from the GPS receiver section 60 or from a communication means.

The camera shake correction limit (STB_LIM) records a flag indicating that a digital camera shake exceeds the correction limit. When the digital camera shake actually exceeds the correction limit, this field records flag "FF" (hexadecimal notation).

The following exemplifies rules of changing the additional recording information version (ARI_DAT_VER) in accordance with a change in the field contents of the additional information ARI_DATA. (1) When only the contents of the camera information field are added or changed, the second decimal place of the version number is incremented. (2) When the contents of the recording time information field or later are added or changed, the first decimal place of the version number is incremented. (3) When the contents of the entire additional information ARI_DATA are added or changed to nullify the compatibility of data before the change, an integer value of the version number is incremented.

Data Separation and Data Compression/Decompression

Referring now to FIG. 7, the following describes how the DSP 21 separates image data, audio data, and additional information and how it compresses and decompresses image data and audio data.

When the read/write section 23 reads data in units of VOBUs from the DVD 40, a demultiplexing section 221 separates the data into the image data pack, the audio data pack, and the additional information pack.

The demultiplexing section 221 separates the pack header and the packet header from each pack and supplies the header information to a control section 220. The control section 220 analyzes the header information and extracts the time stamps PTS and DTS to control decoding and reproduction output of image data, image data, and additional information.

The demultiplexing section 221 extracts compressed image data from the separated image data pack and supplies that compressed image data to a video decoder 225 via a buffer 222. The demultiplexing section 221 extracts compressed audio data from the separated audio data pack and supplies that compressed audio data to an audio decoder 226 via a buffer 223. The demultiplexing section 221 extracts additional information from the separated additional information pack and supplies that additional information to an additional information decoder 227 via a buffer 224.

Under control from the control section 220, the video decoder 225 compresses and decompresses image data according to the sequence of the time stamp DTS to restore the image data in units of frames and outputs it to the buffer 228. The control section 220 provides control so as to read the image data from the buffer 228 in the sequence of the time stamp PTS contained in the image data pack and supply the image data to a video signal processing section 231.

Under control from the control section 220, the audio decoder 226 sequentially compresses and decompresses audio data to restore it and outputs the audio data to the buffer 229. The control section 220 provides control so as to read the audio data according to the sequence of the time stamp PTS contained in the audio data pack and supply the audio data to an audio signal processing section 232.

Under control from the control section 220, the additional information decoder 227 reproduces the additional information ARI_DATA about image data for one GOP and outputs the information to a buffer 230. In this case, the additional information decoder 227 generates additional information comprising image data control information Av and display information Ad such as capturing date, time, F number, and lens focal length and outputs these types of information to the buffer 230.

From the buffer 230, the control section 220 reads the additional information about the image data for one GOP at the timing in accordance with the time stamp PTS contained in the additional information pack. Of the additional information, the control section 220 provides control so as to supply the image data control signal Av to the video signal processing section 231 and the display information Ad to an OSD (On Screen Display) circuit 233.

The video signal processing section 231 performs image data processes in accordance with the control information Av about the image data. For example, the video signal processing section 231 controls image data in accordance with the automatic white balance adjustment at the time of capturing.

The display information Ad provides display information such as capturing date, capturing time, F number, and lens focal length. The display information Ad is supplied to a synthesis section 234 and is synthesized there with image data from the video signal processing section 231. The image data from the synthesis section 234 is supplied to the control section 30 via the video/audio output processing section 24 and is displayed on a screen of the LCD 32.

In this example, as mentioned above, the additional information pack is provided with the same time stamp PTS as that for the I picture. Consequently, the display information Ad of the additional information is synthesized for all pictures from images corresponding to the I picture to images for one GOP and is displayed on the screen of the LCD 32.

As mentioned above, according to this embodiment, the additional information is multiplexed for each GOP as a unit of reading and writing captured images. Based on the additional information, the above-mentioned image information as a unit of reading and writing is controlled. In addition, the display screen for the image information displays the necessary additional information such as the capturing date, time, and the like.

The above-mentioned embodiment uses the VOBU, i.e., the capturing time information about one GOP as the capturing time information contained in the additional information. From the capturing time information about the I picture, for example, it is possible to calculate and find the capturing time of each frame for the succeeding B and P pictures. The frame-based capturing time can be displayed or used as the management information for editing.

[Description of the Variable Speed Reproduction]

According to the embodiment, the ROM 30 of the control section 30 in the imaging apparatus configured as mentioned above stores a program to implement the variable speed reproduction. The following describes the variable speed reproduction.

The variable speed reproduction according to the embodiment processes only the I picture out of the VOBU-based information. Now let us assume that the normal reproduction speed is 1× and that any reproduction speed is set to be N×. The embodiment displays only image frames of the I picture per VOBU repeatedly for 15/N times. The variable speed reproduction also controls the screen for the I picture to be displayed according to the corresponding information or displays the corresponding additional information on that screen.

FIG. 8 illustrates a scheme of the variable speed reproduction according to the embodiment. Since information is read or written in units of VOBU on an optical disk as mentioned above, information is read from the optical disk in units of VOBU also during the variable speed reproduction. As shown in FIG. 8A, however, it is assumed that the variable speed reproduction decodes only image data for the I picture out of the VOBU. According to the embodiment, the variable speed reproduction also decodes the additional information about the I picture.

According to the embodiment, as shown in FIG. 8A, the variable speed reproduction extracts decode data from the additional information pack ARI_PCK and a plurality of video packs V_PCK containing image data for the I picture out of the VOBU-based information from the optical disk. That is to say, the additional information pack is configured to be always contained in the decode data extraction range during the variable speed reproduction according to the embodiment.

As indicated with shaded portions in FIG. 8B, only the I picture out of the original video stream data is repeatedly displayed for the number of times corresponding to the N× speed. Further, the additional information ARI_DATA is decoded to display the display information such as the capturing time and the F number in overlap with that I picture. In addition, the control information generated from the additional information ARI_DATA is used to control image data of the I picture.

Figure 10:
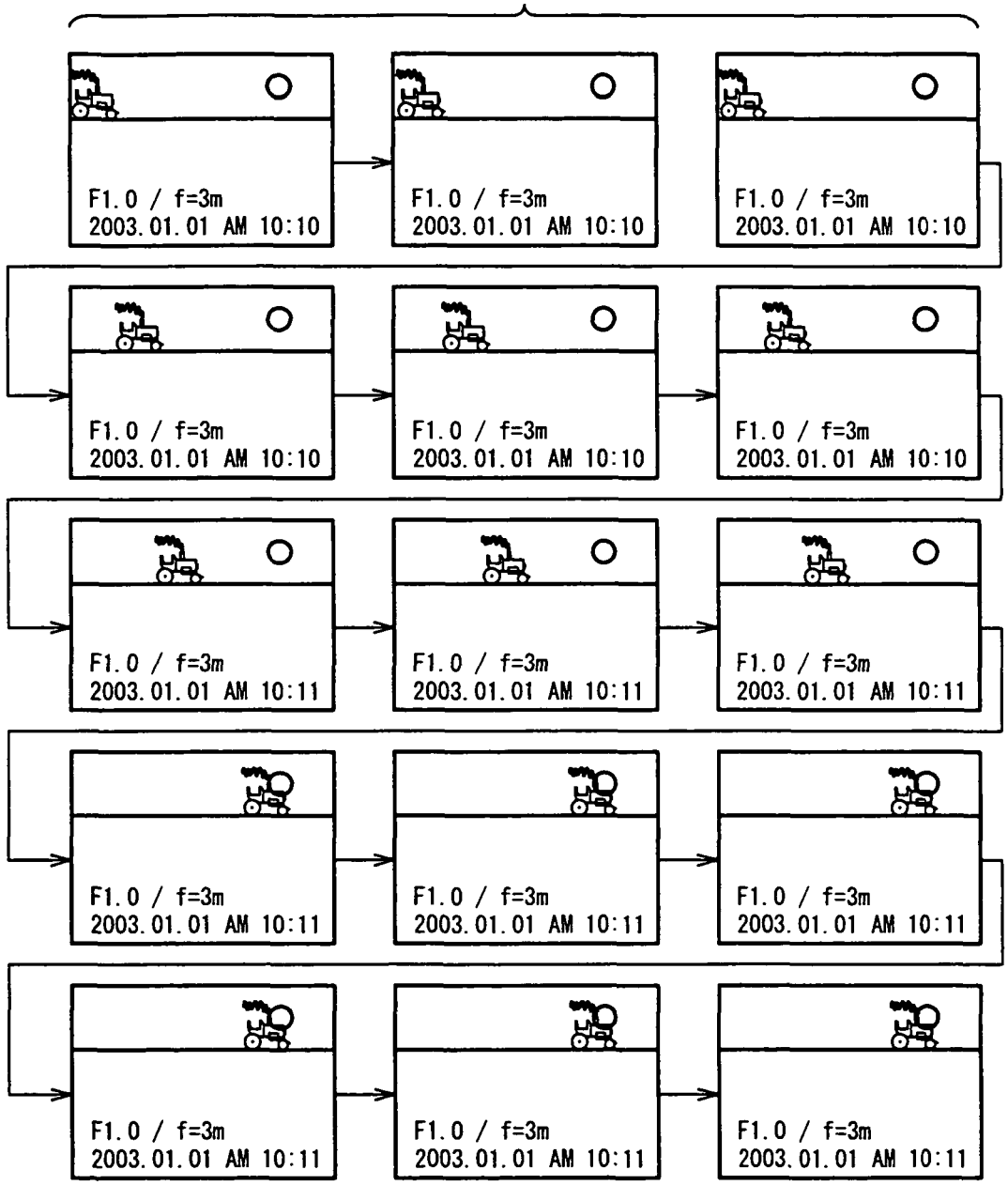
FIG. 10 illustrates the embodiment of the reproducing method according to the present invention.
Figure 11:
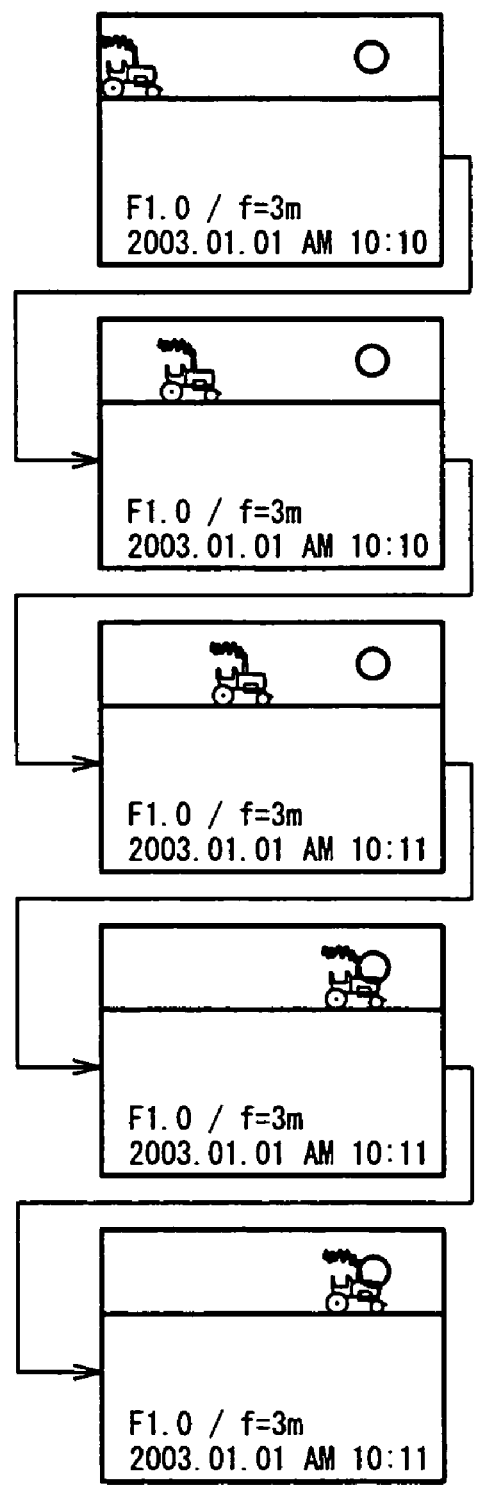
FIG. 11 illustrates the embodiment of the reproducing method according to the present invention.

As examples, FIG. 9 shows transition of LCD screens during 3× speed reproduction. FIG. 10 shows transition of LCD screens during 5× speed reproduction. FIG. 11 shows transition of LCD screens during 15× speed reproduction.

As shown in FIG. 9, the 3× speed reproduction repeatedly reproduces the I picture extracted and decoded from the VOBU-based information at an interval of five times or frames (i.e., 15/3) on a VOBU basis. Further, as shown in FIG. 9, the display information of the corresponding additional information is superimposed on each I picture.

As shown in FIG. 10, the 5× speed reproduction repeatedly reproduces the I picture extracted and decoded from the VOBU-based information at an interval of three times or frames (i.e., 15/5) on a VOBU basis. Further, as shown in FIG. 10, the display information of the corresponding additional information is superimposed on each I picture.

Moreover, as shown in FIG. 11, the 15× speed reproduction repeatedly reproduces the I picture (one frame) extracted and decoded from the VOBU-based information once (i.e., 15/15) on a VOBU basis. Further, as shown in FIG. 11, the display information of the corresponding additional information is superimposed on each I picture.

Figure 12:
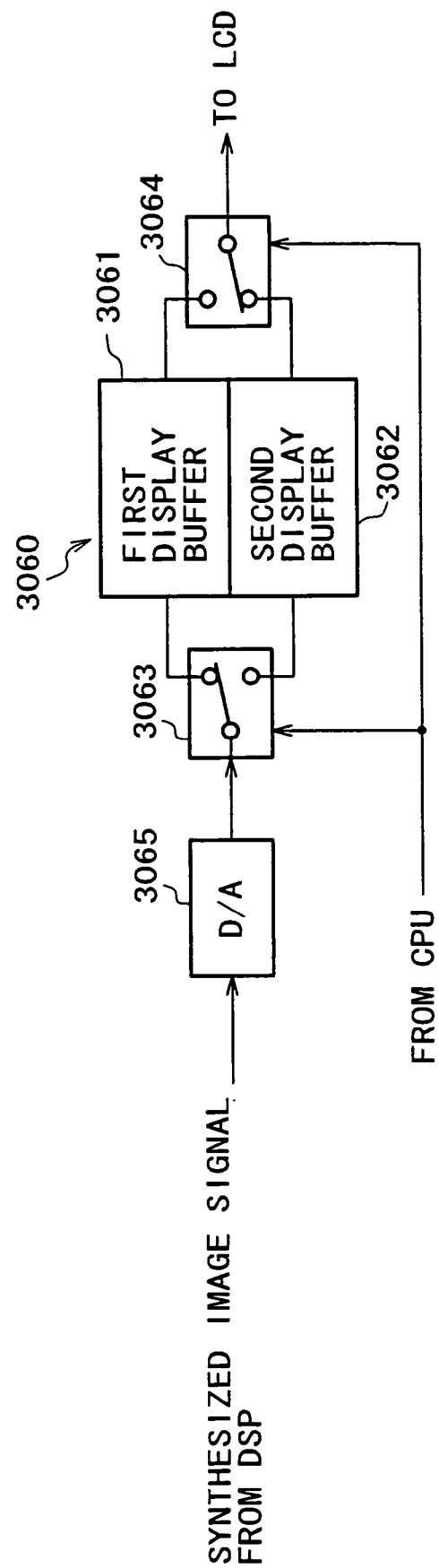
FIG. 12 illustrates the embodiment of the reproducing method according to the present invention.

The following describes processes in the control section 30 during the above-mentioned variable speed reproduction. FIG. 12 shows a configuration of display buffer memory in the LCD controller 306. Display buffer memory 3060 in the LCD controller 306 according to this example comprises two display buffers, i.e., a first display buffer 3061 and a second display buffer 3062. Switch circuits 3063 and 3064 are provided for input and output sides of the display buffer memory 3060.

AD/A converter 3065 converts the synthesized image signal synthesized with the additional information from the DSP 21 into analog image data. A switch circuit 3063 selectively writes the converted analog image data to either of the first display buffer 3061 and the second display buffer 3062.

The synthesized image signal is read from either the first display buffer 3061 or the second display buffer 3062 selected by the switch circuit 3064 and then is supplied to LCD 32 to be displayed on its screen.

In this case, the CPU 301 provides control to select either of the switch circuits 3063 and 3064 provided at the input and output sides of the display buffer memory 3060. When image data is read from one of the two display buffers 3061 and 3062 for the display buffer memory 3060, image data is written to the other display buffer.

The following describes process operations of the control section 30 during the variable speed reproduction with reference to a flowchart in FIG. 13.

When performing the variable speed reproduction, a user uses the operation and input section 31 to enter an N value for the N× speed and instructs the start of the variable speed reproduction. For example, there may be available several methods of entering an N value for the N× speed such as selecting any of predetermined N values, directly entering an N value, and rotating a rotary knob. The N value may be a decimal instead of an integer.

The control section 30 starts the flowchart in FIG. 13 in accordance with user's operations to set the N value for the N× speed of the variable speed reproduction and to instruct the start of the variable speed reproduction using the operation and input section 31 as mentioned above.

The process first identifies the above-mentioned N value for the N× speed (step S101). The process then obtains data in units of VOBU from the optical disk 40 (step S102). The process extracts data in the decode data extraction range out of the VOBU-based data during the variable speed reproduction (step S103). That is to say, the process extracts the additional information pack ARI_PCK and a plurality of video packs V_PCK including image data of the I picture.

The process separates the additional information pack ARI_PCK from the video packs V_PCK including image data of the I picture within the decoded at a extraction range of the extracted data. Data of the additional information pack ARI_PCK is supplied to the additional information decoder 227. The video packs V_PCK are supplied to the video decoder 225 (step S104).

The video decoder 225 compresses and decompresses image data of the I picture to restore the image data. The additional information decoder 227 decodes and reproduces the additional information (step S105). The synthesis section 234 synthesizes the restored image data of the I picture with the additional information's display data generated from the reproduced additional information as mentioned above. The D/A converter 3065 converts the synthesized image signal in to an analog signal. The analog signal is then written to the first or second display buffer 3061 or 3062 of the display buffer memory 3060 whichever is used for image frame writing (step S106).

The previously written image data is read from a display frame output side in parallel with the above-mentioned writing. The display frame output side corresponds to the first or second display buffer 3061 or 3062 other than the one used for writing image frames. The reproduced image is displayed on the screen of the LCD 32.

The CPU 301 of the control section 30 determines whether it is successful or not to repeatedly read and reproduce 15/N frames of image data comprising the additional information synthesized with the I picture from the display buffer at the display frame output side (step S107).

When it is determined at step S107 that it is unsuccessful to repeatedly read and reproduce 15/N frames of image data comprising the additional information synthesized with the I picture from the display buffer at the display frame output side, it is determined whether or not the user instructs termination of the variable speed reproduction by means of input operations using the operation and input section 31 (step S110). When there is provided an instruction to terminate the variable speed reproduction, the process routine of the variable speed reproduction terminates.

When it is determined at step S110 that no instruction is given to terminate the variable speed reproduction, the process continues to read image data comprising the additional information synthesized with the I picture supplied from the display buffer at the display frame output side (step S111) and then returns to step S107.

When it is determined at step S107 that it is successful to repeatedly read and reproduce 15/N frames of image data comprising the additional information synthesized with the I picture from the display buffer at the display frame output side, the switch circuit 3063 is changed to the switch circuit 3064 or vice versa. The image frame writing side is changed to the display frame output side or vice versa between the first and second display buffers 3061 and 3062 of the display buffer memory 3060 (step S108).

While the display buffer writes image data comprising the additional information synthesized with the I picture so far decoded from the VOBU to be displayed next, the changeover at step S108 changes the display buffer from the image frame writing side to the display frame output side. The reproduced image is displayed on the screen of the LCD 32.

The process proceeds from step S108 to step S109. The control section 30 provides control to incorporate VOBU-based data from the optical disk 40. The process then returns to step S103 and repeats the above-mentioned operations to perform the variable speed reproduction as illustrated in FIGS. 9 through 11.

An image signal output terminal 26V supplies a monitor receiver with the same image data as the display image data from the switch circuit 3064. As a result, the monitor receiver also displays the same reproduced images as shown in FIGS. 9 through 11 during the variable speed reproduction.

If an I picture to be reproduced is marked with the camera shake correction limit flag enabled (set to [FF]) in the additional information ARI_DATA corresponding to that I picture, it is highly possible that the I picture is not clear. It may be preferable to skip to the next I picture without reproducing that I picture.

Other Modifications

According to the above-mentioned embodiment, the additional information is created in correspondence with the I picture. The same time stamp PTS as that for the I picture is inserted into the packet compliant with the private 1 packet format in the additional information pack. Further, it may be preferable not to attach the time stamp PTS to the additional information pack.

Since the additional information can be associated with GOP-based image data, it does not always need to correspond to the I picture. Accordingly, the additional information may be associated with a central picture whether it is the B picture or the P picture. In this case, the time stamp PTS is not provided in a packet compliant with the private 1 packet format in the additional information pack.

The above-mentioned embodiment makes it possible to use a private 2 packet as shown in FIG. 14C instead of the private 1 packet format as a packet containing the additional information ARI_DATA in the additional information pack ARI_PCK.

Obviously, the recording method and the reproducing method according to the present invention can be applied not only to the above-mentioned imaging apparatus, but also to various electronic devices that compress to record image data and audio data. In such case, of course, the compression method is not limited to the MPEG system.

The recording media are not limited to optical disks but may include magnetic recording media such as hard disks and semiconductor recording media such as card-type memory.

According to the above-mentioned embodiment, only a control signal for image data is generated as control information from the additional information. Further, it is possible to generate the additional information for audio data equivalent to one GOP. An audio data control signal can be generated from the additional information about the audio data. In this manner, the audio signal processing section 232 can be configured to control audio data.

For example, audio data can be recorded by changing AGC characteristics depending on whether a built-in microphone or an external microphone is used as the microphone 15. In this case, the additional information ARI_DATA contains information indicating whether the built-in microphone or the external microphone is used.

During reproduction, the additional information is used to generate a control signal for the audio data. Based on the control signal, the audio signal processing section 232 can control audio data in accordance with whether an audio signal is generated from the built-in microphone or the external microphone.

What is claimed is:

1. A method of compressing and recording image information as a plurality of video object units on a DVD recording medium according to a DVD-video format according to a decoding and reproducing unit, the method comprising:
performing compression of inputted image data;
generating additional information about the inputted image data; and
multiplexing, in each video object unit, an additional information block that includes the additional information generated in the generating step at a block position immediately after a pack that contains reproduction management information of the inputted image data and immediately before a group of blocks that include compressed image information processed by compression encoding through the use of only image information in the decoding and reproducing unit, and recording the additional information block on the recording medium,
wherein the additional information that is multiplexed and recorded on the recording medium includes at least application information, recording time information, and camera information, and the application information includes a vendor name as a manufacturer of a product, and a product name;
each video object unit is a unit of reading and writing, and includes (1) the pack that contains reproduction management information of the inputted image data, (2) the additional information block, and (3) the group of blocks that include compressed image information processed by compression encoding through the use of only image information in the decoding and reproducing unit; and
wherein said additional information includes at least information about the condition and time of obtaining the image data, and said additional information block and at least one of the corresponding group of blocks includes a same presentation time stamp (PTS), which is time management information about reproduction output of the information in the decoding and reproducing unit.

2. The method according to claim 1, wherein the additional information comprises one or more of the blocks.

3. The method according to claim 2, wherein the additional information block is multiplexed at a predetermined block position and is recorded on the recording medium.

4. The method of claim 1, wherein the multiplexing step comprises multiplexing only one additional information block in a video object unit corresponding to each group of blocks.

5. The method of claim 1, wherein the additional information includes an additional recording identifier.

6. The method of claim 1, wherein the recording time information includes time zone information.

7. The method of claim 1, wherein the application information includes an application identifier and manufacturer information, in addition to the vendor name and the product name.

8. The method of claim 1, wherein each video object unit includes exactly one navigation pack containing the reproduction management information and exactly one additional information block.

9. A recording apparatus that records compressed image data as a plurality of video object units on a DVD recording medium according to a DVD-video format according to a decoding and reproducing unit, the apparatus comprising:
data compression means for performing compression encoding of inputted image data;
an additional information generation means for generating additional information about the inputted image data; and
recording control means for multiplexing, in each video object unit, an additional information block that includes the additional information generated by the additional information generation means at a block position immediately after a pack that contains reproduction management information of the inputted image data and immediately before a group of blocks that include compressed image information processed by compression encoding through the use of only image information in the decoding and reproducing unit, and recording the additional information block on the recording medium,
wherein the additional information that is multiplexed and recorded on the recording medium includes at least application information, recording time information, and camera information, and the application information includes a vendor name as a manufacturer of a product, and a product name;
each video object unit is a unit of reading and writing, and includes (1) the pack that contains reproduction management information of the inputted image data, (2) the additional information block, and (3) the group of blocks that include compressed image information processed by compression encoding through the use of only image information in the decoding and reproducing unit; and
wherein said additional information includes at least information about the condition and time of obtaining the image data, and said additional information block and at least one of the corresponding group of blocks includes a same presentation timestamp (PTS), which is time management information about reproduction output of the information in the decoding and reproducing unit.

10. The recording apparatus according to claim 9, wherein the additional information comprises one or more of the blocks.

11. The recording apparatus according to claim 10, wherein the recording control means multiplexes the additional information block at a predetermined block position and records the additional information block on the recording medium.

12. The recording apparatus of claim 9, wherein the additional information includes an additional recording identifier.

13. A reproducing method, comprising:
reading compressed image information according to a decoding and reproducing unit from DVD recording medium according to a DVD-video format, decompressing the compressed image information, and reproducibly outputting image information according to the decoding and reproducing unit, wherein the recording medium records inputted image data as a plurality of video object units in a data compression manner according to the decoding and reproducing unit, and records an additional information block, the additional information block obtained by multiplexing, in each video object unit, an additional information block that includes additional information generated by an additional information generation means at a block position immediately after a pack that contains reproduction management information of the inputted image data and immediately before a group of blocks including compressed image information processed by compression encoding through the use of only image information in the decoding and reproducing unit and recording the additional information block on the recording medium, wherein the additional information that is multiplexed and recorded on the recording medium includes at least application information, recording time information, and camera information, and the application information includes a vendor name as a manufacturer of a product, and a product name; and
extracting the additional information contained in the decoding and reproducing unit and reproducibly outputting the additional information in synchronization with reproduction output of the image information according to the decoding and reproducing unit,
wherein each video object unit is a unit of reading and writing, and includes (1) the pack that contains reproduction management information of the inputted image data, (2) the additional information block, and (3) the group of blocks that include compressed image information processed by compression encoding through the use of only image information in the decoding and reproducing unit; and
wherein said additional information includes at least information about the condition and time of obtaining the image data, and said additional information block and at least one of the corresponding group of blocks includes a same presentation timestamp (PTS), which is time management information about reproduction output of the information in the decoding and reproducing unit.

14. The reproducing method according to claim 13, wherein the additional information comprises one or more of the blocks.

15. The reproducing method according to claim 13, wherein the additional information block is multiplexed and recorded at a predetermined block position in the read/write unit.

16. A reproducing method, comprising:
reading compressed image information according to a decoding and reproducing unit from a DVD recording medium according to a DVD-video format, decompressing the compressed image information, and reproducibly outputting image information according to the decoding and reproducing unit, wherein the recording medium records inputted image data as a plurality of video object units in a data compression manner according to the decoding and reproducing unit, and records an additional information block, the additional information block obtained by multiplexing, in each video object unit, an additional information block that includes additional information generated by an additional information generation means at a block position immediately after a pack that contains reproduction management information of the inputted image data and immediately before a group of blocks including compressed image information processed by compression encoding through the use of only image information in the decoding and reproducing unit and recording the additional information block on the recording medium, wherein the additional information that is multiplexed and recorded on the recording medium includes at least application information, recording time information, and camera information, and the application information includes a vendor name as a manufacturer of a product, and a product name; and
extracting the additional information contained in the decoding and reproducing unit, reproducing the additional information in synchronization with reproduction output of the image information according to the decoding and reproducing unit, and using the reproduced additional information to control image information according to the decoding and reproducing unit,
wherein each video object unit is a unit of reading and writing, and includes (1) the pack that contains reproduction management information of the inputted image data, (2) the additional information block, and (3) the group of blocks that include compressed image information processed by compression encoding through the use of only image information in the decoding and reproducing unit; and
wherein said additional information includes at least information about the condition and time of obtaining the image data, and said additional information block and at least one of the corresponding group of blocks includes a same presentation timestamp (PTS), which is time management information about reproduction output of the information in the decoding and reproducing unit.

17. A reproducing method, comprising:
reading compressed image information according to a decoding and reproducing unit from a DVD recording medium according to a DVD-video format, decompressing only encoded image information in the decoding and reproducing unit, wherein the encoded image information belongs to the read and compressed image information and is processed by compression encoding through the use of only image information in the decoding and reproducing unit, and reproducibly outputting the encoded image information in the decoding and reproducing unit repeatedly for the number of decoding and reproducing units fewer than the number of decoding and reproducing units, wherein the recording medium records inputted image data as a plurality of video object units in a data compression manner according to the decoding and reproducing unit and records an additional information block, the additional information block obtained by multiplexing, in each video object unit, an additional information block that includes additional information generated by an additional information generation means at a block position immediately after a pack that contains reproduction management information of the inputted image data and immediately before a group of blocks including compressed image information processed by compression encoding through the use of only image information in the decoding and reproducing unit and recording the additional information block on the recording medium, wherein the additional information that is multiplexed and recorded on the recording medium includes at least application information, recording time information, and camera information, and the application information includes a vendor name as a manufacturer of a product, and a product name; and extracting the additional information contained in the decoding and reproducing unit and reproducibly outputting the additional information in synchronization with reproduction output of the encoded image information in the decoding and reproducing unit, wherein each video object unit is a unit of reading and writing, and includes (1) the pack that contains reproduction management information of the inputted image data, (2) the additional information block, and (3) the group of blocks that include compressed image information processed by compression encoding through the use of only image information in the decoding and reproducing unit; and wherein said additional information includes at least information about the condition and time of obtaining the image data, and said additional information block and at least one of the corresponding group of blocks includes a same presentation timestamp (PTS), which is time management information about reproduction output of the information in the decoding and reproducing unit.

18. A reproducing apparatus, comprising:

read means for reading compressed image information according to a decoding and reproducing unit from a DVD recording medium according to a DVD-video format, wherein the recording medium records inputted image data as a plurality of video object units in a data compression manner according to a decoding and reproducing unit, and records an additional information block, the additional information block obtained by multiplexing, in each video object unit, an additional information block that includes additional information generated by an additional information generation means at a block position immediately after a pack that contains reproduction management information of the inputted image data and immediately before a group of blocks including compressed image information processed by compression encoding through the use of only image information in the decoding and reproducing unit and recording the additional information block on the recording medium, wherein the additional information that is multiplexed and recorded on the recording medium includes at least application information, recording time information, and camera information, and the application information includes a vendor name as a manufacturer of a product, and a product name;

separation means for separating the compressed image information and the additional information from the read means;

means for decompressing the compressed image information from the separation means;

means for reproducibly outputting the decoding and reproducing unit information out of the decompressed image information; and means for reproducibly outputting the additional information from the separation means in synchronization with reproduction output of the decoding and reproducing unit information, wherein each video object unit is a unit of reading and writing, and includes (1) the pack that contains reproduction management information of the inputted image data, (2) the additional information block, and (3) the group of blocks that include compressed image information processed by compression encoding through the use of only image information in the decoding and reproducing unit; and wherein said additional information includes at least information about the condition and time of obtaining the image data, and said additional information block and at least one of the corresponding group of blocks includes a same presentation timestamp (PTS), which is time management information about reproduction output of the information in the decoding and reproducing unit.

19. A reproducing apparatus, comprising:

means for reading compressed image information according to a decoding and reproducing unit from a DVD recording medium according to a DVD-video format;

means for decompressing the compressed image information; and means for reproducibly outputting image information according to the decoding and reproducing unit, wherein the recording medium records inputted image data as a plurality of video object units in a data compression manner according to the decoding and reproducing unit, and records an additional information block, the additional information block obtained by multiplexing, in each video object unit, an additional information block that includes additional information generated by an additional information generation means at a block position immediately after a pack that contains reproduction management information of the inputted image data and immediately before a group of blocks including compressed image information processed by compression encoding through the use of only image information in the decoding and reproducing unit and recording the additional information block on the recording medium, wherein the additional information that is multiplexed and recorded on the recording medium includes at least application information, recording time information, and camera information, and the application information includes a vendor name as a manufacturer of a product, and a product name; and wherein the apparatus extracts the additional information contained in the decoding and reproducing unit, reproduces the additional information in synchronization with reproduction output of the image information according to the decoding and reproducing unit, and uses the reproduced additional information to control image information according to the decoding and reproducing unit;

each video object unit is a unit of reading and writing, and includes (1) the pack that contains reproduction management information of the inputted image data, (2) the additional information block, and (3) the group of blocks that include compressed image information processed by compression encoding through the use of only image information in the decoding and reproducing unit; and wherein said additional information includes at least information about the condition and time of obtaining the image data, and said additional information block and at least one of the corresponding group of blocks includes a same presentation timestamp (PTS), which is time management information about reproduction output of the information in the decoding and reproducing unit.

20. A reproducing apparatus, comprising:

read means for reading compressed image information according to a decoding and reproducing unit from a DVD recording medium according to a DVD-video format, wherein the recording medium records inputted image data as a plurality of video object units in a data compression manner according to the decoding and reproducing unit, and records an additional information block, the additional information block obtained by multiplexing, in each video object unit, an additional information block that includes additional information generated by an additional information generation means at a block position immediately after a pack that contains reproduction management information of the inputted image data and immediately before a group of blocks including compressed image information processed by compression encoding through the use of only image information in the decoding and reproducing unit and recording the additional information block on the recording medium, wherein the additional information that is multiplexed and recorded on the recording medium includes at least application information, recording time information, and camera information, and the application information includes a vendor name as a manufacturer of a product, and a product name;

separation means for separating the compressed image information and the additional information from the read means;

means for decompressing only encoded image information in the decoding and reproducing unit, wherein the encoded image information belongs to the compressed image information from the separation means and is processed by compression encoding through the use of only image information in the decoding and reproducing unit, means for reproducibly outputting the decompressed encoded image information in the decoding and reproducing unit repeatedly for the number of decoding and reproducing units fewer than the number of decoding and reproducing units; and means for reproducibly outputting the additional information from the separation means in synchronization with reproduction output of the encoded image information in the decoding and reproducing unit, wherein each video object unit is a unit of reading and writing, and includes (1) the pack that contains reproduction management information of the inputted image data, (2) the additional information block, and (3) the group of blocks that include compressed image information processed by compression encoding through the use of only image information in the decoding and reproducing unit; and wherein said additional information includes at least information about the condition and time of obtaining the image data, and said additional information block and at least one of the corresponding group of blocks includes a same presentation timestamp (PTS), which is time management information about reproduction output of the information in the decoding and reproducing unit.

21. An imaging apparatus, comprising:

an imaging element;

an imaging optical system for forming an object image on the imaging element;

data compression means for performing compression encoding of image data inputted from the imaging element as a plurality of video object units;

an additional information generation means for generating additional information about the image data inputted from the imaging element; and recording control means for multiplexing, in each video object unit, an additional information block that includes the additional information generated by the additional information generation means at a block position immediately after a pack that contains reproduction management information of the inputted image data and immediately before a group of blocks including compressed image information processed by compression encoding through the use of only image information in the decoding and reproducing unit, and recording the additional information block on a DVD recording medium according to a DVD-video format, wherein the additional information that is multiplexed and recorded on the recording medium includes at least application information, recording time information, and camera information, and the application information includes a vendor name as a manufacturer of a product, and a product name;

each video object unit is a unit of reading and writing, and includes (1) the pack that contains reproduction management information of the inputted image data, (2) the additional information block, and (3) the group of blocks that include compressed image information processed by compression encoding through the use of only image information in the decoding and reproducing unit; and wherein said additional information includes at least information about the condition and time of obtaining the image data, and said additional information block and at least one of the corresponding group of blocks includes a same presentation timestamp (PTS), which is time management information about reproduction output of the information in the decoding and reproducing unit.

22. The imaging apparatus according to claim 21, wherein the additional information comprises one or more of the blocks.

23. The imaging apparatus according to claim 22, wherein the recording control means multiplexes the additional information block at a predetermined block position and records the additional information block on the recording medium.

24. The imaging apparatus of claim 21, wherein the additional information includes an additional recording identifier.

* * * * *